US009092981B2

(12) United States Patent
Suzuki et al.

(10) Patent No.: US 9,092,981 B2
(45) Date of Patent: Jul. 28, 2015

(54) ROAD CONDITION MANAGEMENT SYSTEM AND ROAD CONDITION MANAGEMENT METHOD

(75) Inventors: Akihiro Suzuki, Kanagawa (JP); Mikio Morioka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 438 days.

(21) Appl. No.: 13/577,146

(22) PCT Filed: Dec. 20, 2010

(86) PCT No.: PCT/JP2010/007353

§ 371 (c)(1), (2), (4) Date: Oct. 23, 2012

(87) PCT Pub. No.: WO2011/108052

PCT Pub. Date: Sep. 9, 2011

(65) Prior Publication Data

US 2013/0033603 A1 Feb. 7, 2013

(30) Foreign Application Priority Data

Mar. 3, 2010 (JP) ................................ 2010-046596

(51) Int. Cl.

*H04N 7/18* (2006.01)
*G08G 1/04* (2006.01)
*G08G 1/0967* (2006.01)

(52) U.S. Cl.

CPC ............ *G08G 1/04* (2013.01); *G08G 1/096775* (2013.01)

(58) Field of Classification Search

CPC ...................................................... B60R 11/04
USPC ......................................................... 348/148
See application file for complete search history.

(56) References Cited

U.S. PATENT DOCUMENTS

| | | | |
|---|---|---|---|
| 6,359,571 | B1 | 3/2002 | Endo et al. |
| 2002/0094825 | A1 | 7/2002 | Endo et al. |

(Continued)

FOREIGN PATENT DOCUMENTS

| | | |
|---|---|---|
| CN | 1645436 | 7/2005 |
| CN | 101632109 | 1/2010 |

(Continued)

OTHER PUBLICATIONS

Japan Office action, mail date is Feb. 4, 2014.
China Office action, dated Mar. 4, 2014 along with an english translation thereof.

*Primary Examiner* — Sath V Perungavoor
*Assistant Examiner* — Fabio Lima
(74) *Attorney, Agent, or Firm* — Greenblum & Bernstein, P.L.C.

(57) ABSTRACT

The present invention provides a road condition management system that can grasp an accurate state of a road condition and reduce a burden on a checker. A road facility management system for managing road facilities includes an on-board device and an information server. The on-board device includes a camera attached to a vehicle to photograph the outside of the vehicle, an image recognition unit that applies image recognition for detecting road facilities to a photographed image, a transmission image information generation unit that generates transmission image information including the photographed image, a road facility information database having stored therein road facility information, and a transmission unit that outputs the transmission image information if a recognition result by the image recognition unit is different from the road facility information stored in the road facility information database.

16 Claims, 13 Drawing Sheets

(56) References Cited

U.S. PATENT DOCUMENTS

| | | | | |
|---|---|---|---|---|
| 2003/0212567 | A1* | 11/2003 | Shintani et al. | 705/1 |
| 2004/0062442 | A1* | 4/2004 | Laumeyer et al. | 382/190 |
| 2004/0252192 | A1* | 12/2004 | Adachi et al. | 348/148 |
| 2005/0196016 | A1* | 9/2005 | Sato et al. | 382/103 |
| 2006/0152592 | A1* | 7/2006 | Chishima et al. | 348/211.3 |
| 2009/0072972 | A1* | 3/2009 | Pederson | 340/541 |
| 2009/0313078 | A1* | 12/2009 | Cross | 705/9 |
| 2010/0099353 | A1 | 4/2010 | Komori | |
| 2010/0289632 | A1* | 11/2010 | Seder et al. | 340/436 |

FOREIGN PATENT DOCUMENTS

| | | |
|---|---|---|
| JP | 2000-123289 | 4/2000 |
| JP | 2001-023090 | 1/2001 |
| JP | 2001-136513 | 5/2001 |
| JP | 2004-56629 | 2/2004 |
| JP | 2004-171159 | 6/2004 |
| JP | 2008-310744 | 12/2008 |
| JP | 2009-98756 | 5/2009 |

* cited by examiner

Fig.3

| |
|---|
| ROAD FACILITY ID |
| LOCATION INFORMATION |
| ROAD FACILITY TYPE |
| ROAD FACILITY STATUS |

| |
|---|
| STATUS |
| PHOTOGRAPHING LOCATION |
| VEHICLE ID |
| VEHICLE TYPE |
| VEHICLE SPEED |
| PHOTOGRAPHING DATE AND TIME |
| ROAD FACILITY TYPE |
| RECOGNITION RELIABILITY |
| PHOTOGRAPHED IMAGE |

ROAD CONDITION MANAGEMENT SYSTEM AND ROAD CONDITION MANAGEMENT METHOD

RELATED APPLICATION

This application claims the benefit of priority from Japanese Patent Application No. 2010-046596 filed on Mar. 3, 2010 in Japan, the entire contents of which are incorporated herein by reference.

TECHNICAL FIELD

The present invention relates to a road condition management system and a road condition management method for managing a road condition such as a sign and, more specifically, to a road condition management system and a road condition management method for acquiring information concerning a road condition in a vehicle and managing the road condition information.

BACKGROUND ART

Conventionally, there is known a road condition management system for acquiring information concerning a road condition in a vehicle and managing the road condition information. The system includes an on-board device provided in the vehicle in order to acquire information concerning a road condition and an information server that manages the information concerning the road condition. The on-board device includes a camera for photographing a road condition and a recognition device that applies image recognition to a photographed image obtained by the camera and detects a road condition. The information server collects the information concerning the road condition detected in the vehicle and manages the information.

By using such a road condition management system, for example, an administrator (a road condition administrator) of a road management agency such as a public peace authority can grasp that abnormality is present in a road condition and take measures such as repairing of the road condition. In this case, the on-board device can be mounted on, for example, a police vehicle.

Such a road condition management system adopts, in order to automate management of a road condition, means for photographing a road condition with the camera in the on-board device and applying image recognition with software of the recognition device. Therefore, in order to improve reliability of road condition information managed in the information server, it is necessary to improve accuracy of the image recognition.

As a system for acquiring an image of a road with the on-board device mounted on a vehicle, applying the image recognition to the image to detect a road condition, and transmitting result information of the image recognition to an information center, there is a system described in Patent Literature 1. In the system, in order to improve reliability of the result of the image recognition, the information center calculates a certainty factor of the image recognition from a difference between the result of the image recognition acquired from the on-board device and results of the image recognition in the same location accumulated in the past.

CITATION LIST

Patent Literature

Patent Literature 1: Japanese Patent Laid-Open No. 2004-171159

SUMMARY OF INVENTION

Technical Problem

However, in the system of Patent Literature 1, the certainty factor of the image recognition is simply calculated or an average of the certainty factor is simply calculated. Therefore, information concerning a road condition having low reliability of a result of the image recognition is present.

Further, concerning the detection of a road condition, the system of Patent Literature 1 relies on image recognition processing by software. However, since there is likelihood of misrecognition in the image recognition processing, plural sample data are necessary to improve certainty of information. Further, it is unclear how much sample data should be collected to obtain sufficient certainty.

The present invention has been devised in view of the abovementioned problems and it is an object of the present invention to provide, on the premise that a state of a road condition is checked by a recognition ability of a human (a checker) that is more certain than the image recognition processing by the software, a road condition management system convenient for the checker to perform such a check.

Solution to Problem

According to an aspect of the present invention, there is provided a road condition management system for managing a road condition, the road condition management system having a configuration including an on-board device and an information server. The on-board device includes a camera configured to be attached to a vehicle to photograph the outside of the vehicle, an image recognition unit that applies image recognition for detecting a road condition to a photographed image obtained by photographing by the camera, a transmission image information generation unit that generates transmission image information including the photographed image, a road condition information database having stored therein road condition information, and a transmission image information output unit that outputs the transmission image information if a recognition result by the image recognition unit is different from the road condition information stored in the road condition information database. The information server includes a reception unit that receives the transmission image information, a photographed image output unit that outputs the photographed image included in the transmission image information to enable a checker to visually recognize the photographed image, and an input unit for the checker to input a check result of the photographed image output from the output unit.

According to another aspect of the present invention, there is provided an on-board device, the on-board device having a configuration including a camera configured to be attached to a vehicle to photograph the outside of the vehicle, an image recognition unit that applies image recognition for detecting a road condition to a photographed image obtained by photographing by the camera, a transmission image information generation unit that generates transmission image information including the photographed image, a road condition information database having stored therein road condition information, and a transmission image information output unit that outputs the transmission image information if a recognition result by the image recognition unit is different from the road condition information stored in the road condition information database.

According to still another aspect of the present invention, there is provided an information server for managing a road condition, the information server having a configuration including a reception unit that receives transmission image information including a photographed image obtained by photographing by a camera configured to be attached to a vehicle to photograph the outside of a vehicle, a photographed image output unit that outputs the photographed image included in the transmission image information to enable a checker to visually recognize the photographed image, and an input unit for the checker to input a check result of the photographed image output from the photographed image output unit.

According to still another aspect of the present invention, there is provided a road condition management method executed using a road condition management system including an on-board device and an information server, the road condition management method having a configuration including, in the on-board device, photographing the outside of a vehicle with a camera, applying image recognition for detecting a road condition to a photographed image obtained by photographing by the camera, outputting transmission image information including the photographed image if a result of the image recognition is different from road condition information stored in a database of the on-board device, and, in the information server, receiving the transmission image information, outputting the photographed image included in the transmission image information to enable a checker to visually recognize the photographed image, and the checker checking the output photographed image and inputting a checking result.

According to still another aspect of the present invention, there is provided a computer program, the computer program causing an on-board device, which includes a camera configured to be attached to a vehicle to photograph the outside of a vehicle and a road condition information database having stored therein road condition information, to execute an image recognition step for applying image recognition for detecting a road condition to a photographed image obtained by photographing by the camera, a transmission image information generation step for generating transmission image information including the photographed image, a step for determining whether a recognition result by the image recognition step is different from the road condition information stored in the road condition information database, and a transmission image information output step for outputting the transmission image information if the recognition result by the image recognition step is different from the road condition information stored in the road condition information database.

According to still another aspect of the present invention, there is provided a computer program, the computer program causing an information server for managing a road condition to execute a reception step for receiving transmission image information including a photographed image obtained by photographing by a camera attached to a vehicle to photograph the outside of a vehicle, a photographed image output step for outputting the photographed image included in the transmission image information to enable a checker to visually recognize the photographed image, and a check result reception step for receiving a check result by the checker concerning the photographed image output in the photographed image output step.

Advantageous Effects of Invention

The present invention can provide a road condition management system having effects that, since the checker visually checks photographed images, the checker can grasp an accurate state of a road condition and, since the checker can visually check only photographed images that need to be checked rather than all the photographed images and input a result of the check, it is possible to reduce a burden on the checker.

As explained below, other aspects are present in the present invention. Therefore, the disclosure of the present invention intends to provide a part of the present invention and does not intend to limit the scope of the invention described and claimed herein.

BRIEF DESCRIPTION OF DRAWINGS

FIG. 3 is a diagram showing a configuration of a road facility information database of the on-board device in the embodiment of the present invention.

DESCRIPTION OF EMBODIMENTS

Figure 1:
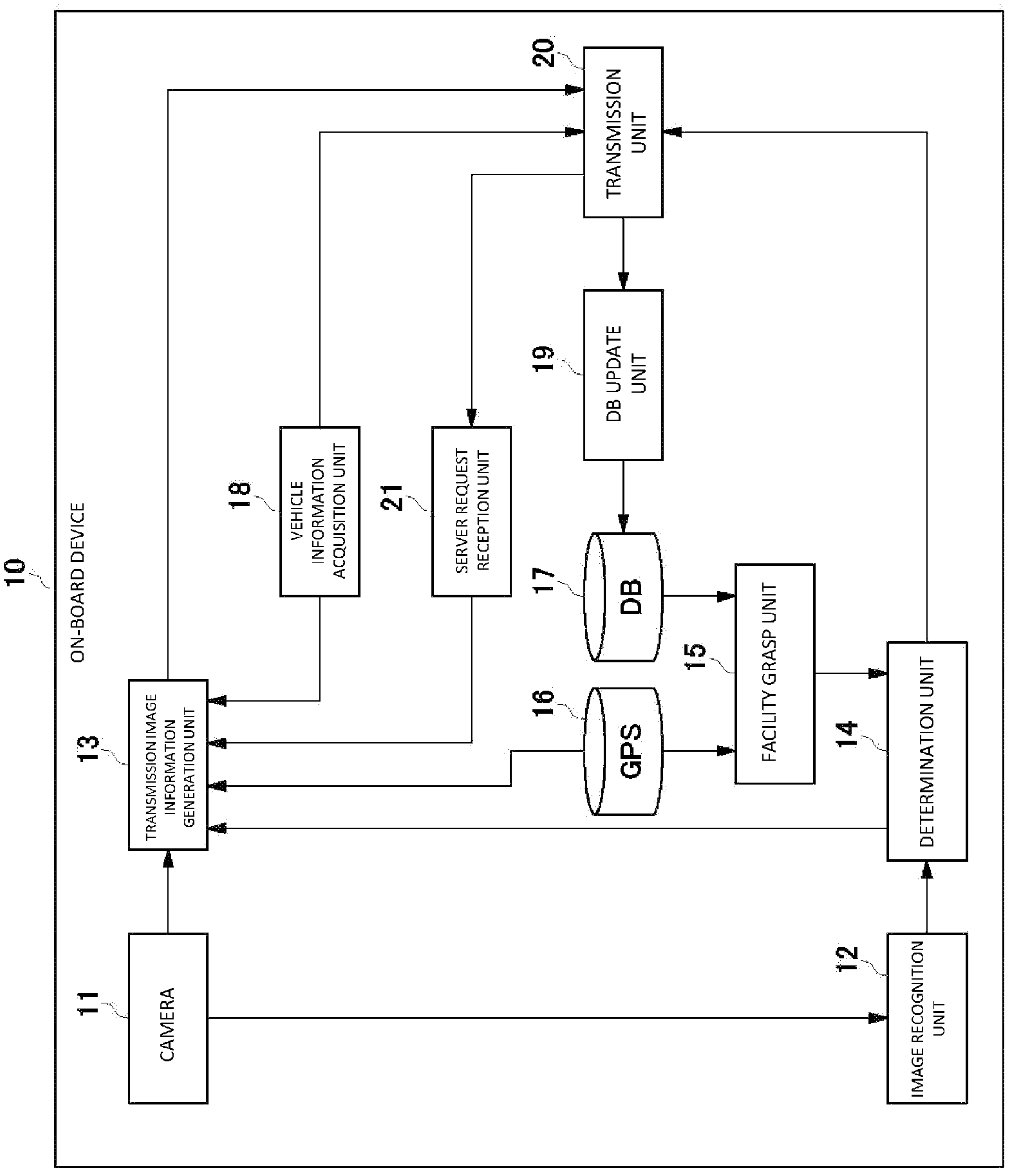
FIG. 1 is a block diagram showing a configuration of an on-board device in an embodiment of the present invention.

The present invention is explained below in detail. An embodiment explained blow is a mere example of the present invention. The present invention can be modified to various forms. Therefore, specific components and functions disclosed below do not limit the scope of patent claims.

According to an aspect of the present invention, there is provided a road condition management system for managing a road condition, the road condition management system having a configuration including an on-board device and an information server. The on-board device includes a camera attached to a vehicle to photograph the outside of the vehicle, an image recognition unit that applies image recognition for detecting a road condition to a photographed image obtained by photographing by the camera, a transmission image information generation unit that generates transmission image information including the photographed image, a road condition information database having stored therein road condition information, and a transmission image information output unit that outputs the transmission image information if a recognition result by the image recognition unit is different from the road condition information stored in the road condition information database. The information server includes a reception unit that receives the transmission image information, a photographed image output unit that outputs the photographed image included in the transmission image information to enable a checker to visually recognize the photographed image, and an input unit for the checker to input a check result of the photographed image output from the output unit.

With this configuration, the on-board device outputs the transmission image information if the result obtained by applying the image recognition to the photographed image is different from the road condition information stored in the database. The information server includes the photographed image output unit that outputs the photographed image to enable the checker to visually check the photographed image and the input unit for the checker to input a check result of the photographed image output from the output unit. Therefore, the checker can grasp an accurate state of a road condition by visually checking the photographed image. Further, the checker can visually check only photographed images that need to be checked rather than all photographed images and input a result of the check. Therefore, it is possible to reduce a burden on the checker.

In the road condition management system, the information server includes the road condition management information database having stored therein the road condition management information for managing a road condition. The information server updates the road condition management information database according to the check result.

With this configuration, the road condition management information database of the information server is updated to reflect the result obtained by the visual check by the checker. Therefore, it is possible to manage accurate information of a road condition in the information server.

In the road condition management system, the on-board device updates the road condition information database according to the check result.

With this configuration, after the checker checks abnormality of a road condition or a new road condition, the database of the on-board device is updated according to the check and thereafter transmission image information is not transmitted concerning the same road condition. Therefore, the checker is prevented from redundantly checking the same road condition.

In the road condition management system, the on-board device outputs the transmission image information in the transmission image information output unit when a road condition corresponding to the road condition information stored in the road condition information database is not detected in the image recognition unit.

With this configuration, if a road condition that should be present according to the database of the on-board device cannot be photographed by the camera, the checker checks a photographed image. By checking the photographed image, the checker can determine whether measures such as repairing of the road condition are necessary because, for example, the road condition is hidden or broken or measures such as repairing of the road condition are unnecessary because, for example, the road condition cannot be photographed behind a large vehicle or the image recognition is simply inaccurate.

In the road condition management system, the on-board device generates transmission image information in the transmission image information generation unit when a road condition not stored in the road condition information database is detected in the image recognition unit.

With this configuration, if a road condition not stored in the database of the on-board device is photographed by the camera, the checker checks a photographed image. By checking the photographed image, the checker can determine whether the road condition is certainly present or whether a new road condition is actually absent because, for example, there is an error in the image recognition.

In the road condition management system, the road condition management information includes reference images. The information server includes a reference selection unit that selects a reference image corresponding to a photographed image from the road condition management information database. The photographed image output unit outputs, together with the photographed image, the reference image selected by the reference selection unit.

With this configuration, the checker can check the photographed image while comparing the photographed image with the reference image. Therefore, it is possible to conveniently determine whether abnormality is present in a road condition.

In the road condition management system, the road condition management information includes plural reference images concerning one road condition. The reference selection unit selects a reference image having photographing conditions closest to photographing conditions for the photographed image output by the photographed image output unit.

With this configuration, the checker can check, together with the photographed image, a reference image having photographing conditions similar to photographing conditions for the photographed image. Therefore, it is possible to more accurately determine, for example, whether abnormality is present in a road condition.

In the road condition management system, even if a detection result by the image recognition unit coincides with the road condition information stored in the road condition information database, the transmission image information output unit outputs, if the reliability of the image recognition by the image recognition unit is high, transmission image information in which a photographed image is designated as a reference image candidate. The information server stores the reference image candidate in the road condition management information database as a reference image of the road condition management information.

With this configuration, the information server can store, as a reference image, a photographed image with high reliability of the image recognition obtained by the on-board device.

In the road condition management system, the reliability of the image recognition is a degree of coincidence of a pattern of a road condition stored in advance and a pattern included in a photographed image.

With this configuration, the information server can store, as a reference image, a photographed image having a pattern close to the pattern of the road condition stored in advance.

In the road condition management system, the information server includes a necessary image request unit that requests, when a reference image corresponding to a photographed image included in transmission image information is not stored in the road condition management information server, the on-board device to send a reference image candidate corresponding to the photographed image. The transmission image information output unit outputs, in response to the request, transmission image information including a reference image corresponding to the photographed image.

With this configuration, if a reference image is absent in the information server, it is possible to acquire a reference image candidate from the on-board device.

In the road condition management system, if the reception unit receives plural pieces of transmission image information concerning one road condition, the photographed image output unit preferentially outputs a photographed image included in transmission image information having a high check priority degree among the plural pieces of transmission image information.

With this configuration, the checker does not need to redundantly check photographed images concerning the same road condition and preferentially check a photographed image with a high priority degree among plural photographed images.

In the road condition management system, the check priority degree is calculated on the basis of at least one of a photographing period of time of a photographed image included in transmission image information, a vehicle type, and vehicle speed during photographing.

With this configuration, a photographed image easily checked by the checker is preferentially checked.

In the road condition management system, the information server includes a check list storage unit for storing transmission image information received by the reception unit. The photographed image output unit outputs the transmission image information stored in the check list storage unit.

With this configuration, even if the information server receives transmission image information, the information server once stores the received transmission image information in the check list storage unit rather than immediately causing the checker to perform a check using a photographed image included in the transmission image information. Therefore, it is possible to acquire plural pieces of transmission image information concerning the same road condition and cause the checker to perform the check using a photographed image having a high priority degree among the plural pieces of transmission image information.

In the road condition management system, the transmission image information output unit of the on-board device transmits transmission image information to the information server by radio communication. The reception unit of the information server receives the transmission image information from the on-board device by radio communication.

With this configuration, it is possible to transmit and receive the transmission image information using the radio communication between the on-board device and the information server.

In the road condition management system, the transmission image information output unit of the on-board device records transmission image information in a recording medium. The reception unit of the information server reads out the transmission image information from the recording medium.

With this configuration, it is possible to exchange the transmission image information using the recording medium between the on-board device and the information server.

According to another aspect of the present invention, there is provided an on-board device, the on-board device having a configuration including a camera configured to be attached to a vehicle to photograph the outside of the vehicle, an image recognition unit that applies image recognition for detecting a road condition to a photographed image obtained by photographing by the camera, a transmission image information generation unit that generates transmission image information including the photographed image, a road condition information database having stored therein road condition information, and a transmission image information output unit that outputs the transmission image information if a recognition result by the image recognition unit is different from the road condition information stored in the road condition information database.

With this configuration, it is possible to output an image that needs to be checked by the checker out of photographed images obtained by photographing by the camera. This is convenient for a visual check by the checker.

According to still another aspect of the present invention, there is provided an information server for managing a road condition, the information server having a configuration including a reception unit that receives transmission image information including a photographed image obtained by photographing by a camera attached to a vehicle to photograph the outside of a vehicle, a photographed image output unit that outputs the photographed image included in the transmission image information to enable a checker to visually recognize the photographed image, and an input unit for the checker to input a check result of the photographed image output from the photographed image output unit.

With this configuration, the checker can visually check a photographed image and input a result of the check. Therefore, it is possible to accurately manage information concerning a road condition.

According to still another aspect of the present invention, there is provided a road condition management method executed using a road condition management system including an on-board device and an information server, the road condition management method having a configuration including, in the on-board device, photographing the outside of a vehicle with a camera, applying image recognition for detecting a road condition to a photographed image obtained by photographing by the camera, and outputting transmission image information including the photographed image if a result of the image recognition is different from road condition information stored in a database of the on-board device, and, in the information server, receiving the transmission image information, outputting the photographed image included in the transmission image information to enable a checker to visually recognize the photographed image, and the checker checking the output photographed image and inputting a check result.

With this method, as in the road condition management system, since the checker visually checks a photographed image, the checker can grasp an accurate state of a road condition. Further, the checker can visually check only photographed images that need to be checked rather than all photographed images and input a result of the check. Therefore, it is possible to reduce a burden on the checker.

According to still another aspect of the present invention, there is provided a computer program, the computer program causing an on-board device, which includes a camera attached to a vehicle to photograph the outside of a vehicle and a road condition information database having stored therein road condition information, to execute an image recognition step for applying image recognition for detecting a road condition to a photographed image obtained by photographing by the camera, a transmission image information generation step for generating transmission image information including the photographed image, a step for determining whether a recognition result by the image recognition step is different from the road condition information stored in the road condition information database, and a transmission image information output step for outputting the transmission image information if the recognition result by the image recognition step is different from the road condition information stored in the road condition information database.

With this computer program, as in the on-board device, it is possible to output an image that needs to be checked by the checker out of photographed images obtained by photographing by the camera. This is convenient for a visual check by the checker.

According to still another aspect of the present invention, there is provided a computer program, the computer program causing an information server for managing a road condition to execute a reception step for receiving transmission image information including a photographed image obtained by photographing by a camera attached to a vehicle to photograph the outside of a vehicle, a photographed image output step for outputting the photographed image included in the transmission image information to enable a checker to visually recognize the photographed image, and a check result reception step for receiving a check result by the checker concerning the photographed image output in the photographed image output step.

With this computer program, as in the information server, the checker can visually check a photographed image and input a result of the check. Therefore, it is possible to accurately manage information concerning a road condition.

Figure 2:
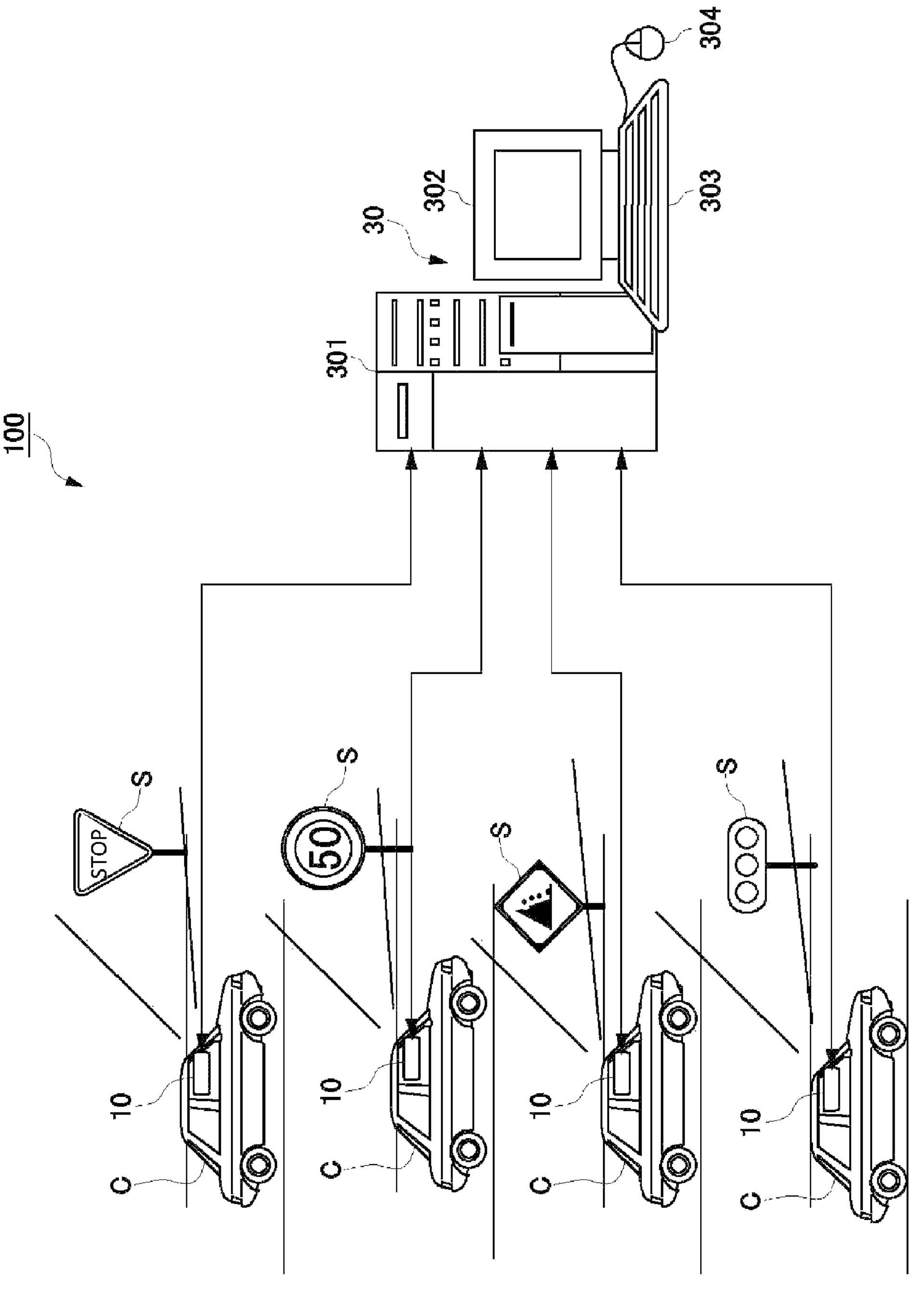
FIG. 2 is a diagram showing a configuration of a road facility management system in the embodiment of the present invention.

A road condition management system in an embodiment of the present invention is explained below. Road conditions managed by the road condition management system includes, holes formed on roads, fallen objects on the roads, and buildings besides road facilities such as signs and traffic lights. In this embodiment, as an example of the road condition management system, a road facility management system for managing road facilities such as signs and traffic lights is explained. The road facility management system in this embodiment includes an on-board device and an information server. FIG. 1 is a block diagram showing the configuration of the on-board device in this embodiment. FIG. 2 is a diagram showing the configuration of the road facility management system in this embodiment. First, the configuration and the operation of the road facility management system are schematically explained with reference to FIG. 2. Thereafter, the configurations and the operations of the on-board device and the information server are explained.

As shown in FIG. 2, a road facility management system 100 in this embodiment includes plural on-board devices 10 that are respectively mounted on plural vehicles C and generate transmission image information and an information server 30 that acquires transmission image information from the plural on-board devices 10 and manages road facilities.

The on-board device 10 photographs, with a camera, a road facility S including a road sign or a traffic light, applies image recognition to a photographed image to detect the road facility S, and generates transmission image information including the photographed image. The on-board device 10 transmits the transmission image information to the information server 30 by radio communication. The information server 30 includes a main body 301 used as arithmetic processing means or storing means, a monitor 302 used as display means, and a keyboard 303 and a mouse 304 used as input means. The information server 30 receives transmission image information from the plural on-board devices 10 respectively mounted on the plural vehicles C and displays photographed images included in the transmission image information on the monitor 302. An operator (a checker) of the information server visually checks the photographed images displayed on the monitor 302 of the information server 30 and inputs a check result using the keyboard 303 and the mouse 304. The information server 30 performs processing such as addition and change of road facility management information on the basis of the input check result. If abnormality is present in a road facility, an administrator (a road facility administrator) of a road management agency checks the check result input by the checker and takes necessary measures such as repairing of the road facility.

(Configuration of on-Board Device 10)

Next, the on-board device 10 is explained. As shown in FIG. 1, the on-board device 10 includes a camera 11, an image recognition unit 12, a transmission image information generation unit 13, a determination unit 14, a facility grasp unit 15, a GPS (Global Positioning System) 16, a road facility information database 17, a vehicle information acquisition unit 18, a database update unit 19, a transmission unit 20, and a server request reception unit 21.

The on-board device 10 is attached to a vehicle C in a location and at an angle for enabling the camera 11 to photograph a front of the vehicle C. The camera 11 always photographs the front of the vehicle C and generates a photographed image of the front of the vehicle C. The camera 11 inputs the generated photographed image to the image recognition unit 12 and the transmission image information generation unit 13. The on-board device 10 may include plural cameras 11. In this case, the on-board device 10 may include, for example, a camera that photographs the front of the vehicle C and a camera that photographs a side of the vehicle C.

The image recognition unit 12 receives the photographed image generated by the camera 11 and applies image recognition for detecting a road facility to the image. Therefore, patterns of road facilities such as road signs and traffic lights are stored in the image recognition unit 12. The image recognition unit 12 applies the image recognition to the photographed image to detect a pattern coinciding with a stored pattern of a road facility from the photographed image. The image recognition unit 12 is connected to the GPS 16. When the image recognition unit 12 detects a road facility from the photographed image, the image recognition unit 12 notifies the determination unit 14 of an image recognition result including positioning information of the GPS 16 (i.e., location information of the vehicle C) at the time of the photographing of the image and recognition reliability at the time when the road facility is detected. The recognition reliability is a score indicating a degree of coincidence of the pattern of the road facility stored in the image recognition unit 12 in advance and the pattern detected in the photographed image and is, for example, a value from 60 to 100. When the score is smaller than 60, this means recognition failure. Therefore, the recognition reliability in the recognition result in which the road facility is recognized is always equal to or higher than 60.

The determination unit 14 determines whether the transmission image information including the photographed image generated by the camera 11 is transmitted to the information server 30. If the determination unit 14 determines that the transmission image information is transmitted to the information server 30, the determination unit 14 instructs the transmission image information generation unit 13 and the transmission unit 20 to transmit the transmission image information. When the transmission image information generation unit 13 receives the instruction for the transmission of the transmission image information from the determination unit 14, the transmission image information generation unit 13 attaches, to the photographed image input from the camera 11, metadata including photographing date and time, the positioning information during the photographing obtained from the GPS 16, and vehicle information during the photographing acquired from the vehicle information acquisition unit 18, generates transmission image information, and outputs the transmission image information to the transmission unit 20. When the transmission unit 20 receives the instruction for the transmission information transmission from the determination unit 14, the transmission unit 20 transmits the transmission image information generated by the transmission image information generation unit 13 to the information server 30.

FIG. 3 is a diagram showing the configuration of the road facility information database 17. In the road facility information database 17, road facility information including a road facility ID, location information, a road facility type, and a road facility status are stored concerning road facilities set on roads. The road facility ID is identification information peculiar to the road facilities and is information including a combination of alphabets and numbers. The location information is information concerning a location where a road facility is set and is information including latitude and longitude. The road facility type is information indicating a type of a road facility such as "traffic light" and "stop," "pedestrian crossing," and "speed limit" concerning road signs. The road facility status is information indicating a state of a road facility such as "normal," "broken," "hidden," and "removed."

The facility grasp unit 15 is connected to the GPS 16 and the road facility information database 17. The facility grasp unit 15 acquires the positioning information (the location information of the vehicle C) from the GPS 16 and retrieves road facility information corresponding to the present location of the vehicle C in the road facility information database 17. If road facility information corresponding to the present location of the vehicle C is present in the road facility information database 17, the facility grasp unit 15 extracts the road facility information. When the facility grasp unit 15 extracts the road facility information corresponding to the present location of the vehicle C, the facility grasp unit 15 notifies the determination unit 14 of the road facility information.

The determination unit 14 performs abnormality determination processing, new facility determination processing, and reference image transmission determination processing. These kinds of processing are explained below in order.

[Abnormality Determination Processing]

When the facility grasp unit 15 extracts the road facility information corresponding to the present location of the vehicle C and notifies the determination unit 14 of the road facility information, the determination unit 14 determines whether an image recognition result of the image recognition unit 12 for an image photographed in the location is notified. If an image recognition result indicating that a road facility corresponding to the road facility information notified from the facility grasp unit 15 is detected is notified from the image recognition unit 12, the determination unit 14 determines that the road facility is normal. If an image recognition result indicating that a road facility corresponding to the road facility information notified from the facility grasp unit 15 is detected is not notified from the image recognition unit 12, the determination unit 14 determines that abnormality is present in the road facility.

Figure 4:
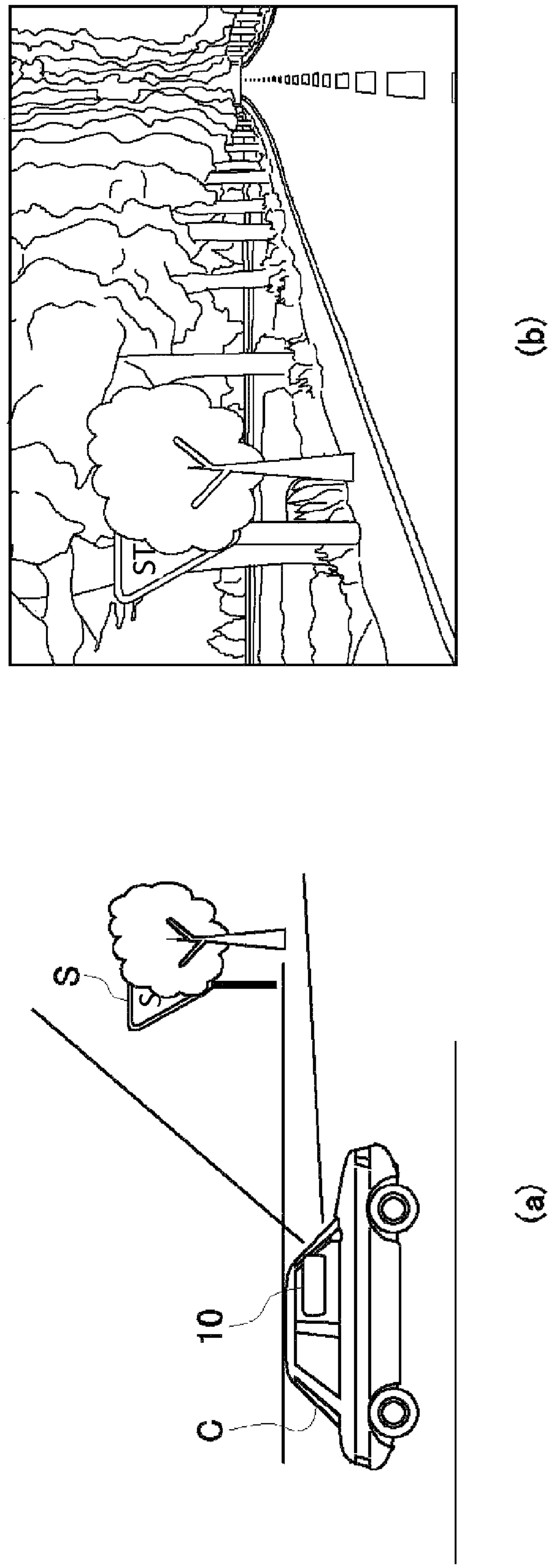
FIG. 4(*a*) is a diagram showing a state in which a road sign behind a tree is photographed and FIG. 4(*b*) is a diagram showing an image obtained by photographing the road sign behind the tree.

FIG. 4(*a*) is a diagram showing a state in which the road sign S ("stop") behind a tree is photographed. FIG. 4(*b*) is a diagram showing an image obtained by photographing the road sign behind the tree. Even if the image recognition unit 12 applies the image recognition to the photographed image shown in FIG. 4(*b*), the image recognition unit 12 cannot detect the load sign "stop." In the state shown in FIG. 4, the road sign S is hidden by the tree and difficult to be seen from a driver of a vehicle. Therefore, the road facility administrator needs to take measures.

If an image recognition result indicating that a road facility corresponding to the road facility information notified from the facility grasp unit 15 is detected is notified to the determination unit 14 from the image recognition unit 12, i.e., the determination unit 14 determines that abnormality is present in the road facility, some abnormality actually occurs in the road facility as shown in the example of FIG. 4 (when the road facility administrator needs to take measures) or abnormality is actually absent in the road facility (the road facility administrator does not need to take measures). If abnormality actually occurs, for example, the road facility is hidden behind the tree as shown in FIG. 4(*b*), the road facility has fallen down, or the road facility have been removed. If an image recognition result indicating that a road facility corresponding to the road facility information notified from the facility grasp unit 15 is detected is not notified from the image recognition unit 12 but abnormality is actually absent in the road facility, for example, the image recognition by the image recognition unit 12 was not accurately applied, the road facility was unable to be photographed by the camera 11 because the road facility was blocked by a large vehicle such as a truck, or the positioning information of the GPS is inaccurate and a shift occurs between the location of the actual photographing and the positioning information.

In this way, if an image recognition result indicating that a road facility corresponding to the road facility information notified from the facility grasp unit 15 is detected is not notified to the determination unit 14 from the image recognition unit 12, even if abnormality is actually absent in the road facility, the determination unit 14 determines that abnormality is present in the road facility. When the determination unit 14 determines that abnormality is present in the road facility, the determination unit 14 instructs the transmission image information generation unit 13 to generate transmission image information and instructs the transmission unit 20 to transmit the transmission image information.

[New Facility Determination Processing]

Next, the new facility determination processing by the determination unit 14 is explained. As explained above, when a road facility is detected as a result of the image recognition by the image recognition unit 12, the image recognition unit 12 notifies the determination unit 14 of the image recognition result. If the image recognition result indicating that the road facility is detected is notified from the image recognition unit 12 but road facility information of a location corresponding to the image recognition result is not notified from the facility grasp unit 15, first, the determination unit 14 determines whether noise is present in the positioning information of the GPS 16. As a result of the determination, if noise is absent in the positioning information of the GPS 16, the determination unit 14 determines that the road facility detected by the image recognition unit 12 is a new road facility. In other words, in this case, the new road facility not stored in the road facility information database 17 is photographed by the camera 11. When the determination unit 14 determines that the road facility is the new road facility, the determination unit 14 instructs the transmission image information generation unit 13 to generate transmission image information and instructs the transmission unit 20 to transmit the transmission image information. As a result of determining whether noise is present in the positioning information of the GPS 16, when the determination unit 14 determines that noise is present, the determination unit 14 performs correction by map matching.

If the determination unit 14 receives the image recognition result indicating that the road facility is detected, when road facility information of a location corresponding to the image recognition result is not input from the facility grasp unit 15, the determination unit 14 may request the facility grasp unit 15 to collate the road facility information in the location. In this case, the facility grasp unit 15 retrieves the road facility information in the location with reference to the road facility information database 17 and reports a retrieval result to the determination unit 14. The determination unit 14 checks the report. If road facility information corresponding to the location is absent, the determination unit 14 determines that a road facility recognized by the image recognition unit 12 concerning the location is a new road facility.

[Reference Image Transmission Determination Processing]

Next, the reference image transmission determination processing by the determination unit 14 is explained. As explained in detail later, in this embodiment, when the checker visually checks the photographed image in which it is determined that abnormality is present in the road facility, a reference image corresponding to the location selected from a road facility management information database 35 of the information server 30 is displayed together with the photographed image in which it is determined that abnormality is present in the road facility. Consequently, the checker can determine, while checking the road facility in a normal state in the reference image, whether abnormality actually occurs in the road facility included in the photographed image in which it is determined that abnormality is present in the road facility. The reference image transmission determination processing is processing for determining whether a photographed image generated by the camera 11 is transmitted to the information server 30 as a reference image candidate to be used as the reference image.

As explained above, in the abnormality determination processing, when the road facility information corresponding to the present location of the vehicle C is input from the facility grasp unit 15, the determination unit 14 refers to an image recognition result of the image recognition unit 12 for an image corresponding to the location. If an image recognition result indicating that a road facility corresponding to the road facility information input from the facility grasp unit 15 is detected is notified, the determination unit 14 determines that the road facility is normal. In this case, since the road facility is normal, it is unnecessary to transmit a photographed image from the on-board device 10 to the information server 30. However, if a road facility is clearly photographed in the photographed image, the photographed image can be used in the information server 30 as the reference image candidate. Therefore, if the determination unit 14 determines that the road facility is normal, the determination unit 14 further set, concerning the photographed image, recognition reliability of the image recognition in the image recognition unit 12. The recognition reliability is a score indicating a degree of coincidence of pattern matching in the image recognition by the image recognition unit 12. If the recognition reliability of the image recognition is equal to or higher than 80, the determination unit 14 determines that the photographed image is transmitted as the reference image candidate. When the determination unit 14 determines that the photographed image is transmitted as the reference image candidate, the determination unit 14 instructs the transmission image information generation unit 13 to generate transmission image information and instructs the transmission unit 20 to transmit the transmission image information.

Next, the transmission image information generation unit 13 is explained. When the transmission image information generation unit 13 is instructed by the determination unit 14 to generate transmission image information, the transmission image information generation unit 13 generates transmission image information. The transmission image information is generated by attaching metadata to the photographed image acquired from the camera 11.

Figures 5, 6:
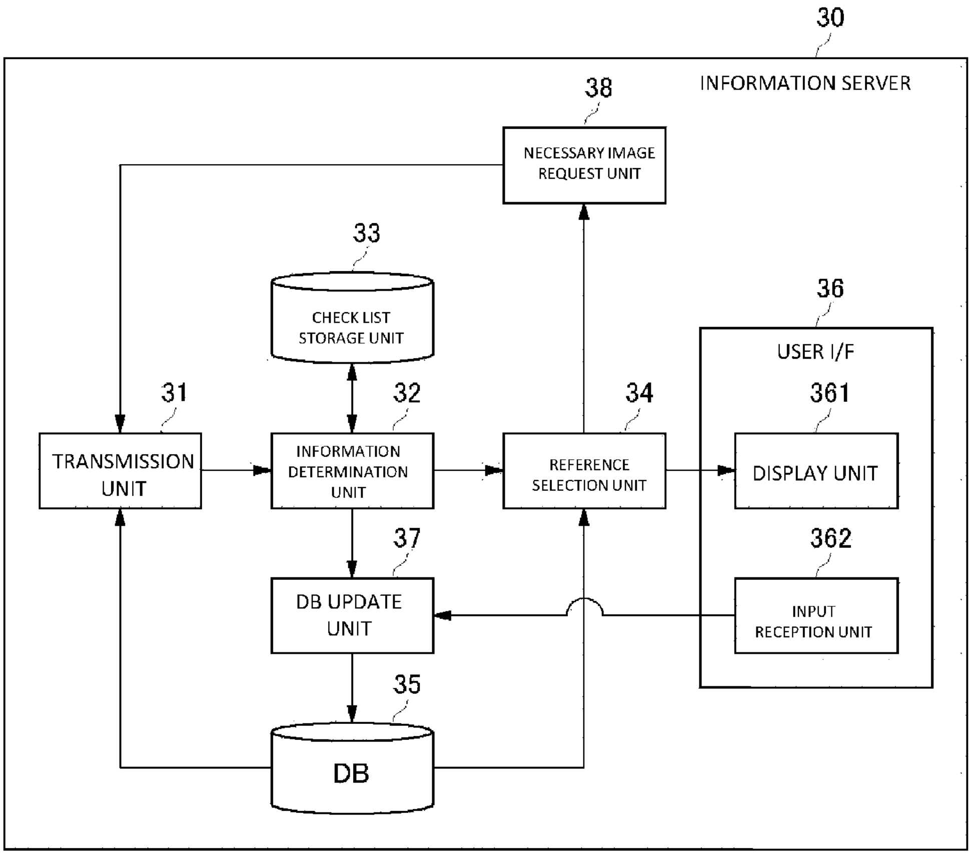
FIG. 5 is a diagram showing syntax of transmission image information transmitted from the on-board device to an information server in the embodiment of the present invention.
FIG. 6 is a block diagram showing the configuration of the information server in the embodiment of the present invention.

FIG. 5 is a diagram showing syntax of transmission image information in this embodiment. As shown in FIG. 5, the transmission image information includes a status, a photographing location, a vehicle ID, a vehicle type, a vehicle speed, photographing date and time, a road facility type, recognition reliability, and a photographed image. The status is any one of "abnormality detected," "new facility detected," and "reference image." If the determination unit 14 determines according to the abnormality determination processing that abnormality is present in the road facility, transmission image information with the status "abnormality detected" is generated. If the determination unit 14 determines according to the new facility determination processing that the road facility is a new road facility, transmission image information with the status "new facility detected" is generated. If the determination unit 14 determines in the reference image transmission determination processing that the photographed image is transmitted as the reference image candidate, transmission image information with the status "reference image" is generated.

The photographing location is positioning information at the time when the image in which the road facility is detected by the image recognition unit 12 is photographed. The information is given from the GPS 16 to the transmission image information generation unit 13. The vehicle ID is identification information peculiar to vehicles. The information is stored in the transmission image information generation unit 13 in advance. The vehicle type is information indicating a type of a vehicle such as "passenger car," "middle-size bus," and "large-size truck." The information is stored in the transmission image information generation unit 13 in advance. The vehicle speed is moving speed of a vehicle at the time when the image in which the road facility is detected by the image recognition unit 12 is photographed. The information is given from the vehicle information acquisition unit 18 to the transmission image information generation unit 13. The vehicle information acquisition unit 18 acquires vehicle information such as vehicle speed making use of a CAN (Controller Area Network).

The photographing date and time is information concerning year, month and day and time when the image in which the road facility is detected by the image recognition unit 12 is photographed. The information is given from a not-shown digital clock to the transmission image information generation unit 13. The road facility type is information indicating a type of a road facility such as "traffic light" and "stop," "pedestrian crossing," and "speed limit" concerning road signs. The information is given from the road facility information database 17 to the transmission image information generation unit 13 through the facility grasp unit 15 and the determination unit 14. The recognition reliability is a score indicating a degree of coincidence of a pattern of a road facility stored in the image recognition unit 12 in advance and a pattern detected in a photographed image. The information is generated by the image recognition unit 12 and given to the transmission image information generation unit 13 through the determination unit 14.

The photographed image is a still image photographed at the photographing date and time or a moving image (a video) photographed in several seconds before or after the photographing date and time. The photographed image is given from the camera 11 to the transmission image information generation unit 13. The transmission image information generation unit 13 may switch, on the basis of the speed of a vehicle and a margin of a transmission band by the transmission unit 20, whether the photographed image in the transmission image information is formed as a still image or a moving image. In this case, if the speed of the vehicle acquired from the vehicle information acquisition unit 18 is high or if there is a margin in the transmission band by the transmission unit 20, the transmission image information generation unit 13 forms the photographed image in the transmission image information as a moving image. Otherwise, the transmission image information generation unit 13 forms the photographed image in the transmission image information as a still image.

The transmission image information generation unit 13 generates transmission image information if the transmission image information generation unit 13 receives an instruction from the determination unit 14. Further, the transmission image information generation unit 13 generates transmission image information if the transmission image information generation unit 13 receives a request for image transmission from the server request reception unit 21. When the transmission image information generation unit 13 receives the instruction from the determination unit 14 or receives the request for image transmission from the server request reception unit 21 and generates transmission image information, the transmission image information generation unit 13 inputs the transmission image information to the transmission unit 20.

The transmission unit 20 performs transmission and reception of information between the transmission unit 20 and the information server 30 by radio communication. When the transmission image information is input from the transmission image information generation unit 13, the transmission unit 20 transmits the transmission image information to the information server 30 according to an instruction for transmission from the determination unit 14. The transmission unit 20 receives a server request and database update information from the information server 30. The server request received by the transmission unit 20 is processed by the server request reception unit 21. The database update information received by the transmission unit 20 is process by the database update unit 19.

When the server request reception unit 21 receives the server request received by the transmission unit 20, the server request reception unit 21 instructs, according to the server request, the transmission image information generation unit 13 to generate transmission image information. The server request is explained below. When the database update unit 19 receives the database update information received by the transmission unit 20, the database update unit 19 updates, according to the information, the road facility information stored in the road facility information database 17. The configuration of the on-board device 10 is explained above.

(Configuration of Information Server 30)

Next, the configuration of the information server 30 is explained. FIG. 6 is a block diagram showing the configuration of the information server 30 in this embodiment. As shown in FIG. 6, the information server 30 includes a transmission unit 31, an information determination unit 32, a check list storage unit 33, a reference selection unit 34, a road facility management information database 35, a user interface 36, a database update unit 37, and a necessary image request unit 38. The user interface 36 includes a display unit 361 and an input reception unit 362. The display unit 361 is realized by the monitor 302 shown in FIG. 2 and software for driving the monitor 302. The input reception unit 362 is realized by the keyboard 303 and the mouse 304 shown in FIG. 2 and software for driving the keyboard 303 and the mouse 304. The other components of the information server 30 shown in FIG. 6 are realized by the hardware of the main body 301 shown in FIG. 2 and software executed by the hardware.

The transmission unit 31 performs transmission and reception of information between the transmission unit 31 and the on-board device 10 by radio communication. When the transmission unit 31 receives the transmission image information from the on-board device 10, the transmission unit 31 passes the transmission image information to the information determination unit 32. If the road facility management information database 35 is updated, the transmission unit 31 transmits information concerning the update to the on-board device 10. Further, if the necessary image request unit 38 issues a request for an image (a server request), the transmission unit 31 transmits the server request to the on-board device 10.

If the transmission image information is transmitted from the on-board device 10, the information determination unit 32 performs processing as explained below according to a state ("abnormality detected," "new facility detected," and "reference image") included in the transmission image information. When the status is "abnormality detected" or "new facility detected," the information determination unit 32 performs check list update processing. When the status is "reference image," the information determination unit 32 passes the transmission image information to the database update unit 37. When the database update unit 37 receives the transmission image information with the status "reference image," the database update unit 37 performs reference image update processing. Further, the information determination unit 32 performs check processing for causing the checker to check a photographed image. These kinds of processing are explained below in order.

[Check List Update Processing]

When the information determination unit 32 receives the transmission image information from the transmission unit 31, the information determination unit 32 checks a status in metadata included in the transmission image information. When the status is "abnormality detected" or "new facility detected," the information determination unit 32 performs the check list update processing. Before explaining the check list update processing by the information determination unit 32, first, a check list and presentation of check target information using the check list are explained.

If abnormality is present in a road facility or a new road facility is present, transmission image information concerning the road facility is sometimes transmitted from the plural on-board devices 10 to the information server 30. When transmission image information concerning a certain road facility is transmitted from the on-board device 10, if the checker immediately checks the transmission image information, a photographed image included in the transmission image information is sometimes a photographed image in which it is difficult for the checker to check whether abnormality is present in the road facility or a new road facility is present. Therefore, when transmission image information is received for the first time concerning a certain road facility, the information server 30 in this embodiment causes, after a fixed period elapses, the checker to check whether abnormality is present in the road facility or the road facility is a new road facility rather than immediately causing the checker to check whether abnormality is present in the road facility or the road facility is a new road facility. Consequently, it can be expected that transmission image information concerning the road facility is transmitted from the plural on-board devices 10 in the fixed period. Further, if plural pieces of transmission image information concerning the same road facility are present after the fixed time elapses, the information server 30 causes the checker to perform a check using transmission image information with which the checker can easily perform the check among the plural pieces of transmission image information. Therefore, the information server 30 includes the check list storage unit 33.

Figure 7:
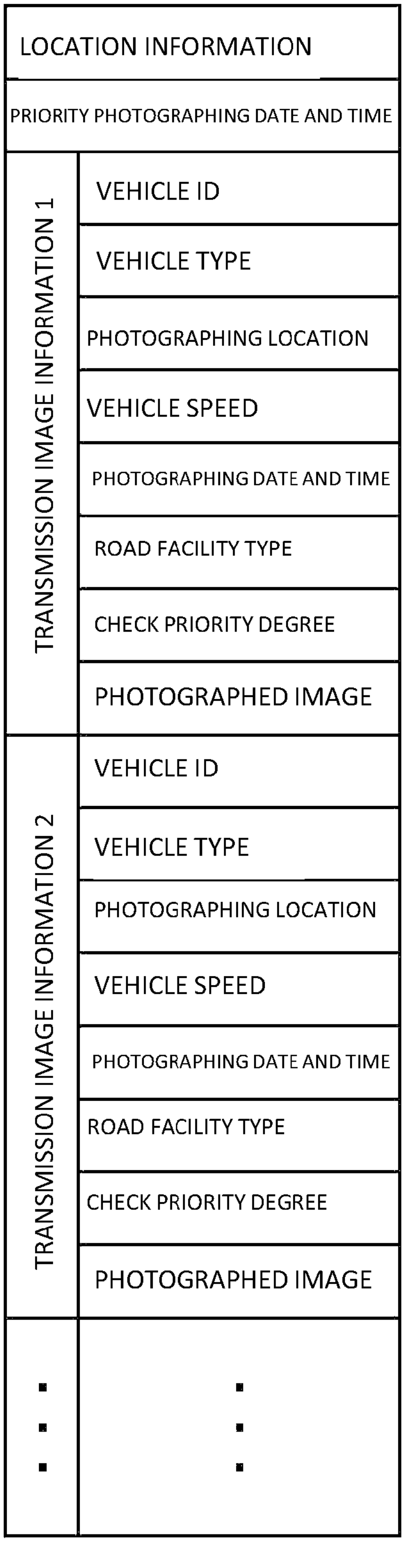
FIG. 7 is a diagram showing a configuration of a checking list in the embodiment of the present invention.

FIG. 7 is a diagram showing the configuration of check wait information of the check list stored in the check list storage unit 33. The check list is a list in which plural pieces of check wait information shown in FIG. 7 are listed. The check wait information is formed by collecting plural pieces of transmission image information for each piece of location information (each photographing location) related to transmission image information transmitted from the on-board device 10. The check wait information includes location information, earliest photographing date and time, and plural pieces of transmission image information. The location information in the check wait information has a certain degree of range. Transmission image information, positioning information included in metadata of which is within the range, is collected in one check wait information. In the transmission image information included in the check wait information, photographing date and time of a photographed image of transmission image information received by the information server 30 first is set as the earliest photographing date and time. Information concerning a check priority degree is attached to the respective pieces of transmission image information in the check wait information.

In the check list update processing, when the information determination unit 32 receives transmission image information with the status "abnormality detected" or "new facility detected" from the transmission unit 31, the information determination unit 32 calculates a check priority degree and gives the check priority degree to the transmission image information. The check priority degree is a priority degree in causing the checker to visually check a photographed image included in the transmission image information. Specifically, if plural photographed images that the checker should visually check are present concerning one road facility, the information server 30 displays the photographed images on a display unit in order from one having the highest priority degree and causes the checker to check the photographed images.

The check priority degree is calculated on the basis of photographing date and time, a vehicle type, and vehicle speed in the metadata included in the transmission image information. Specifically, for example, if the photographing date and time is night, the priority degree is set low. If the photographing date and time is daytime, the priority degree is set high. This is because it is highly likely that a road facility clearly appears in a photographed image during the daytime. For example, if the vehicle type is a passenger car, the priority is set low. If the vehicle type is a middle-size bus, the priority degree is set to a medium degree. If the vehicle type is a large-size truck, the priority degree is set high. This is because it is highly likely that a road facility clearly appears in a photographed image when the on-board device 10 is located higher as in the large-size truck. Further, if the vehicle speed is equal to or higher than 50 km/h, the priority degree is set low. If the vehicle speed is equal to or higher than 30 km/h and lower than 50 km/h, the priority degree is set to a medium degree. If the vehicle speed is lower than 30 km/h, the priority degree is set high. This is because it is highly likely that a road facility clearly appears in a photographed image as the speed of a vehicle is lower.

The information determination unit 32 calculates an average of the priority degrees with reference to the photographing date and time, the vehicle type, and the vehicle speed according to the criteria explained above and sets the average as the check priority degree. The information determination unit 32 may calculate the check priority degree taking into account the image reliability in the metadata included in the transmission image information or directly set the image reliability as the check priority degree.

When the information determination unit 32 calculates the check priority degree concerning the transmission image information received by the transmission unit 31, the information determination unit 32 updates the check list stored in the check list storage unit 33. The number of pieces of transmission image information related to the same location information stored in the check list is limited to a predetermined number (e.g., three). When transmission image information exceeding the predetermined number is transmitted, the information determination unit 32 preferentially stores transmission image information having a high check priority degree in the check list storage unit 33. If transmission image information related to the same location information is already stored in the check list storage unit 33 by a predetermined upper limit number, when a check priority degree of transmission image information received anew is lower than a check priority degree of transmission image information having a lowest check priority degree among the pieces of already-stored transmission image information, the information determination unit 32 deletes the transmission image information received anew. When a check priority degree of transmission image information received anew is higher than a check priority degree of transmission image information having a lowest check priority degree among the pieces of the already-stored transmission image information, the information determination unit 32 deletes the transmission image information having the lowest check priority degree and adds the transmission image information received anew in the check list.

The transmission image information related to the same location information stored in the check list storage unit 33 may be only one. In this case, if second and subsequent pieces of transmission image information are received concerning one road facility, the information determination unit 32 calculates a check priority degree. If the calculated check priority degree is higher than the check priority degree of the transmission image information stored in the check list storage unit 33, the information determination unit 32 replaces the already-stored transmission image information with the transmission image information. If the calculated check priority degree is lower than the check priority degree of the transmission image information stored in the check list storage unit 33, the information determination unit 32 deletes the transmission image information. The number of pieces of transmission image information stored in the check list storage unit 33 concerning one road facility does not have to be limited. In this case, after calculating check priority degrees concerning received all pieces of transmission image information, the information determination unit 32 stores the check priority degrees in the check list storage unit 33. The check list update processing is explained above.

[Reference Image Update Processing]

Next, the reference image update processing is explained. When the database update unit 37 receives transmission image information with the status "reference image" from the information determination unit 32, the database update unit 37 performs the reference image update processing. Before explaining the reference image update processing by the database update unit 37, first, the road facility management information database 35 is explained.

Figure 8:
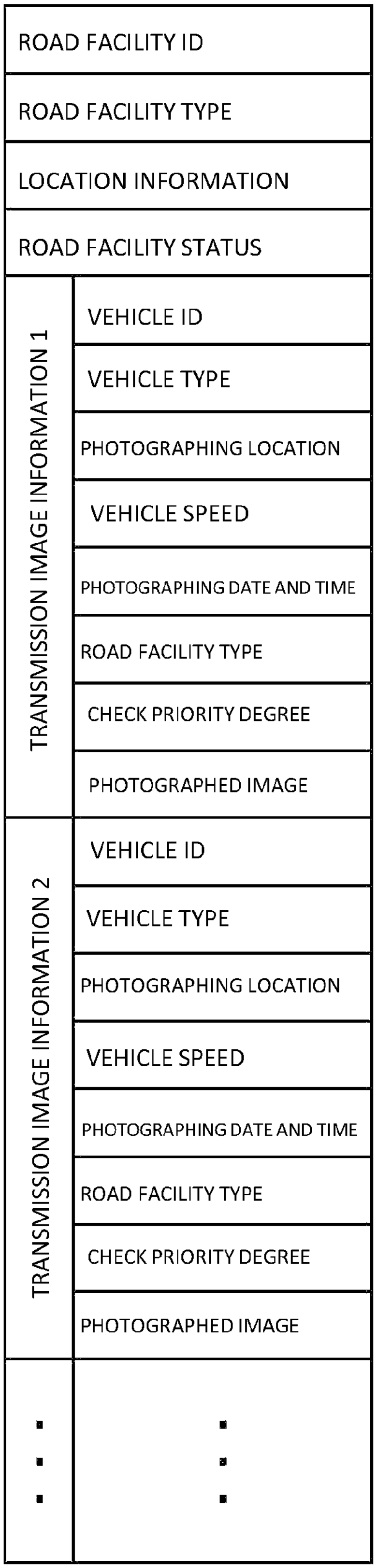
FIG. 8 is a diagram showing a configuration of a road facility management information database of the information server in the embodiment of the present invention.

FIG. 8 is a diagram showing the configuration of the road facility management information database 35. In the road facility management information database 35, road facility management information shown in FIG. 8 is stored for each road facility. The road facility management information includes a road facility ID, a road facility type, location information, a road facility status, and plural pieces of transmission image information. In the road facility management information database 35, concerning road facilities, the number of pieces of transmission image information stored therein is limited to a predetermined number (in this embodiment, six). Contents and data formats of the road facility ID, the road facility type, the location information, and the road facility status are respectively the same as those of the road facility ID, the road facility type, and the location information stored in the road facility information database 17 of the on-board device 10. A photographed image in transmission image information included in the road facility management information is a reference image. The road facility administrator can retrieve road facility management information, the road facility status of which is "broken," "hidden," or "removed," to find a road facility in which a problem occurs and take measures such as repairing.

An initial value of the road facility status is "normal." Specifically, when the road facility management information database 35 is constructed for the first time and if road facility management information of a new road facility is added on the basis of transmission image information, the road facility status is "normal." When transmission image information, the status of which is "abnormality detected," is transmitted from the on-board device 10 and the road facility management information database 35 is updated on the basis of the transmission image information, the road facility status is updated to any one of "broken," "hidden," and "removed" according to content of the update. Update of the road facility management information database 35 based on a check result of the administrator is explained below.

When the database update unit 37 receives transmission image information from the information determination unit 32 anew, the database update unit 37 specifies a road facility with reference to metadata of the transmission image information. The database update unit 37 searches through the road facility management information database 35. If road facility management information of the road facility is absent in the road facility management information database 35, the database update unit 37 creates road facility management information of the road facility anew in the road facility management information database 35 and adds the transmission image information received anew to the road facility management information. As a result of searching through the road facility management information database 35, if road facility management information corresponding to the transmission image information received anew is present, the database update unit 37 checks whether the upper limit number of pieces of transmission image information is already included in the road facility management information. If the number of pieces of transmission image information does not reach the upper limit number, the database update unit 37 adds the transmission image information received anew to the road facility management information.

If the upper limit number of pieces of transmission image information is already included in the road facility management information, the database update unit 37 checks recognition reliability of the transmission image information included in the road facility management information. If recognition reliability of the transmission image information received anew is lower than recognition reliabilities of all pieces of transmission image information included in the road facility management information, the database update unit 37 does not update the road facility management information database 35 and deletes the transmission image information received anew. If recognition reliability of the transmission image information received anew is higher than recognition reliability of any one of the pieces of transmission image information included in the road facility management information, the database update unit 37 deletes transmission image information having lowest recognition reliability and adds the transmission image information received anew to the road facility management information.

[Check Processing]

The information determination unit 32 performs the check processing for causing the checker to check an image. The information determination unit 32 checks whether the check processing for a photographed image is performed in the user interface 36. If the check processing for the photographed image is not performed in the user interface 36, the information determination unit 32 checks, referring to the check list of the check list storage unit 33, whether check wait information, a fixed time (e.g., 72 hours) elapses from earliest photographing date and time of which, is present. If check wait information, the fixed time elapses from earliest photographing date and time of which, is present, the information determination unit 32 outputs transmission image information having a highest check priority degree in the check wait information to the reference selection unit 34. The information determination unit 32 is explained above.

Next, the reference selection unit 34 is explained. When the reference selection unit 34 receives transmission image information for causing the checker to perform a check (the transmission image information is hereinafter referred to as "check target information") from the information determination unit 32, the reference selection unit 34 searches through the road facility management information database 35 and extracts road facility management information corresponding to the check target information. If only one piece of transmission image information is present in the road facility management information, the reference selection unit 34 selects the transmission image information as reference information.

If plural pieces of transmission image information are present in the extracted road facility management information, the reference selection unit 34 selects, as reference information, transmission image information having photographing conditions for a photographed image closest to photographing conditions for a photographed image of the check target information. The reference selection unit 34 determines an approximation degree of photographing conditions for a photographed image on the basis of a photographing period of time, a vehicle type, vehicle speed during photographing, a distance from a photographing location to a road facility, and whether the photographed image is a still image or a moving image. The reference selection unit 34 determines the photographing period of time referring to the photographing date and time of the metadata. The reference selection unit 34 determines the vehicle type referring to the vehicle type of the metadata. The approximation degree is the highest if the vehicle type is the same. Even if the vehicle type is different, the reference selection unit 34 sets the approximation degree relatively high considering that vehicle types are similar because a large-size bus and a large-size truck are large-size vehicles. The reference selection unit 34 determines, referring to the vehicle speed of the metadata, the vehicle speed during photographing according to whether a difference between vehicle speed during photographing of a photographed image included in the check target information (hereinafter referred to as "check target image") and vehicle speed during reference image photographing is larger or smaller than a predetermined threshold. The reference selection unit 34 determines whether a photographing location is far or near to a road facility according to whether a distance between location information of the road facility and a photographing location of the transmission image information is larger or smaller than a predetermined threshold. The reference selection unit 34 determines whether a photographed image is a still image or a moving image according to a data format of the photographed image.

Consequently, the check target image and the reference image are images photographed under similar conditions. The checker can easily check the check target image. For example, if the check target image is a moving image photographed at night, the reference image is also a moving image photographed at night. The reference selection unit 34 transmits the reference information selected in this way and the check target information received from the information determination unit 32 to the display unit 361.

If the status of the check target information is "new facility detected," usually, concerning a road facility of the check target information, road management information is not stored in the road facility management information database 35. In this case, the reference selection unit 34 outputs only the check target information to the display unit 361. If road management information is not stored in the road facility management information database 35 concerning a certain road facility, the reference selection unit 34 may extract other transmission image information related to the road facility from the check list storage unit 33 and output the transmission image information to the display unit 361 together with the transmission image information already received from the information determination unit 32. In this case, reference information is absent. Instead, plural pieces of check target information are output to the display unit 361. In this case, if other transmission image information related to the road facility is absent in the check list storage unit 33, the reference selection unit 34 may store the transmission image information received from the information determination unit 32 in the check list storage unit 33 again and wait for a fixed time to elapse. If other transmission image information is transmitted in the fixed time, the reference selection unit 34 can output the plurality of pieces of check target information to the display unit 361.

If road facility management information is absent in the road facility management information database 35 concerning a certain road facility as explained above, the reference selection unit 34 requests the necessary image request unit 38 to transmit a necessary image. The necessary image request unit 38 generates a server request and transmits the server request to the plural on-board devices 10 via the transmission unit 31.

Figure 9:
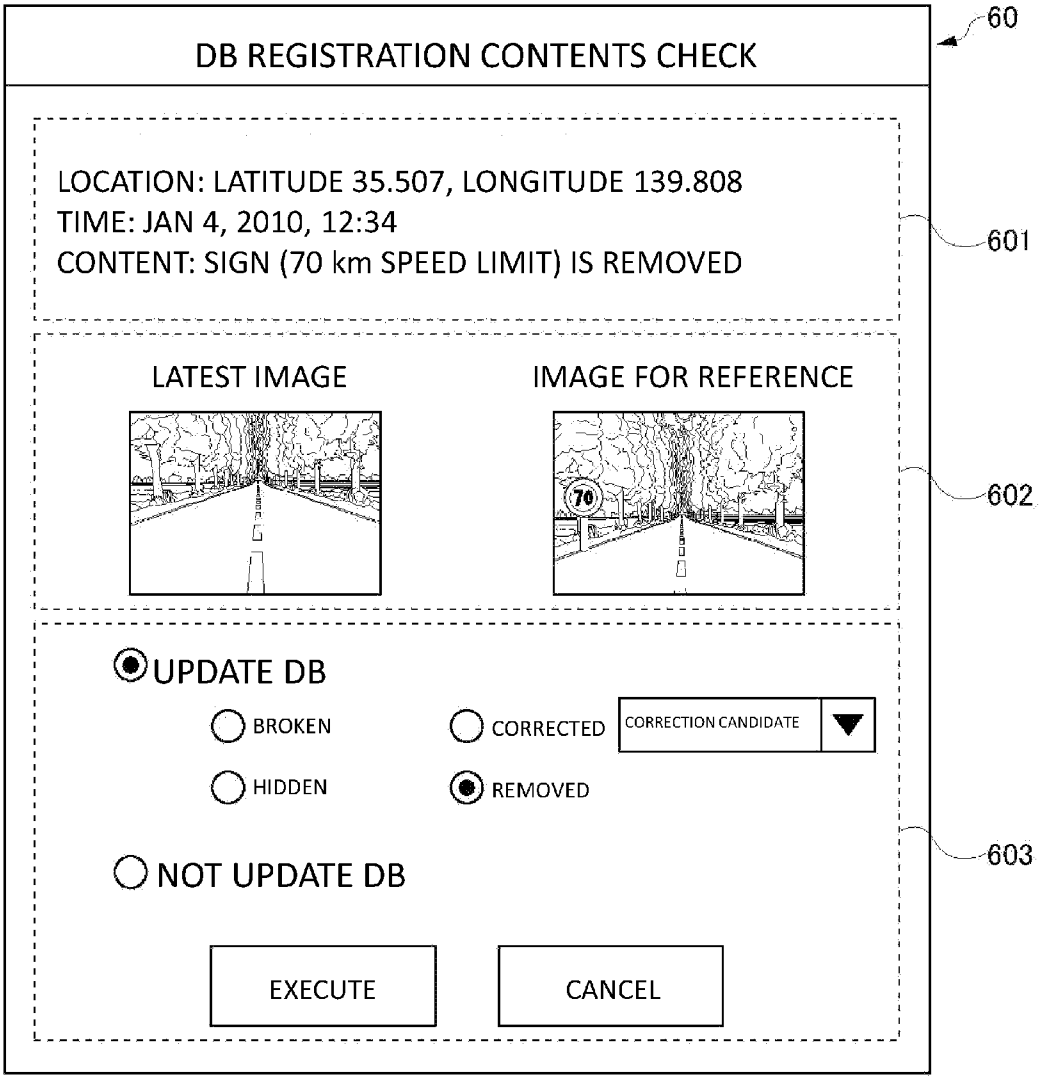
FIG. 9 is a diagram showing a checking screen (status: abnormality detected) in the embodiment of the present invention.
Figure 10:
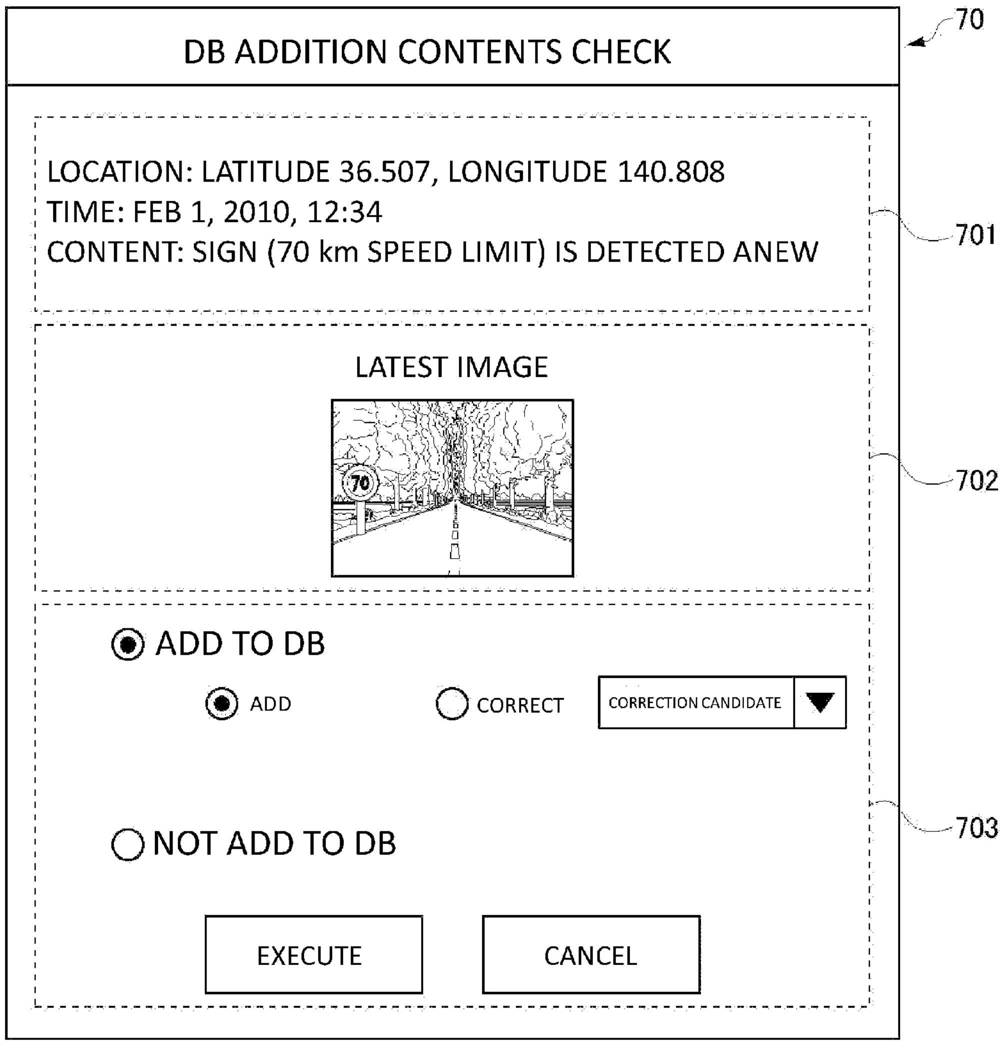
FIG. 10 is a diagram showing a checking screen (status: new facility detected) in the embodiment of the present invention.

FIGS. 9 and 10 are examples of check screens displayed on the display unit 361 of the user interface 36. FIG. 9 is an example of a check screen displayed if the status of the check target information is "abnormality detected." A check screen 60 includes a check basic information area 601, an image area 602, and an input area 603. The check basic information area 601 includes a photographing location and photographing time of the check target information and information concerning a road facility type. In the example shown in the figure, a road facility type ("sign (70 km speed limit)") and content ("removed") input in the input area 603 are displayed in association with each other. In the image area 602, the check target image and the reference image are displayed side by side. The check target image is displayed as a "latest image." The reference image is displayed as an "image for reference." If the reference image is absent, only the check target image is displayed in the image area 602.

The input area 603 is included in the input reception unit 362. The input area 603 is used for the checker to input a check result by operating the keyboard 303 and the mouse 304. The input area 603 is configured to select whether the database is updated. The input area 603 is configured to select, if the database is updated, how the check target image is different from the reference image. Choices in the selection are "broken," "corrected," "hidden," and "removed." If the checker selects "corrected," the checker further selects how the road facility type is corrected. When the checker selects "corrected" and selects the road facility type, the road facility type of the check basic information area 601 is changed according to the selection. In the input area 603, "execute" and "cancel" buttons are further provided. When the checker designates the "cancel" button, an item selected in the input area 603 is cancelled. When the checker designates the "execute" button, the selected item is decided. The selected item is notified to the database update unit 37 from the input reception unit 362.

FIG. 10 is an example of a check screen displayed when the status of the check target information is "new facility detected." A check screen 70 includes a check basic information area 701, an image area 702, and an input area 703. The check basic information area 701 includes a photographing location and photographing time of the check target information and information concerning a road facility type. In the example shown in the figure, a road facility type ("sign (70 km speed limit)") and "detected anew" are displayed in association with each other. In the image area 702, the check target image is displayed as a "latest image." If the reference image is present, the reference image is displayed beside the check target image in the image area 702.

The input area 703 is included in the input reception unit 362. The input area 703 is used for the checker to input a check result by operating the keyboard 303 and the mouse 304. The input area 703 is configured to select whether transmission image information related to an image for check is added to the road facility management information database 35 as road facility management information. The input area 703 is configured to select, if the transmission image information is added to the road facility management information database 35, whether transmission image information is added with contents as described in the road facility type shown in the check basic information area 701 or the road facility type is corrected and added. The input area 703 is configured to select, if "corrected" is selected, how the road facility type is corrected. When the checker selects "corrected" and selects the road facility type, the road facility type of the check basic information area 701 is changed according to the selection. In the input area 703, "execute" and "cancel" buttons are further provided. When the checker designates the "cancel" button, an item selected in the input area 703 is cancelled. When the checker designates the "execute" button, the selected item is decided. The selected item is notified to the database update unit 37 from the input reception unit 362.

The database update unit 37 updates the road facility management information database 35 according to notification from the input reception unit 362. Alternatively, when the database update unit 37 receives notification to the effect that new road facility management information is added to the road facility management information database 35, the database update unit 37 updates the road facility management information database 35 according to the notification. If the database update unit 37 receives notification of addition of new road facility management information to the database from the input reception unit 362 as an input of the checker concerning a check target image of new facility detection, the database update unit 37 adds the transmission image information to the road facility management information database 35 as the new road facility management information. When the transmission image information is added, if correction is selected concerning the road facility type, the database update unit 37 corrects the road facility type of the transmission image information according to selected correction content and then adds the road facility type as the new road facility management information.

If the database update unit 37 receives notification of update of the database from the input reception unit 362 as an input of the checker concerning a check target image of abnormality detection, the database update unit 37 updates the road facility management information database 35 according to designated update content. When the update content input in the input reception unit 362 is "broken," "hidden," or "removed," the database update unit 37 changes the road facility status to "broken," "hidden," or "removed." As explained above, one each piece of maximum six kinds of transmission image information is stored in the road facility management information database 35. In update, the database update unit 37 deletes all the pieces of stored original transmission image information and stores transmission image information checked by the checker in the road facility management information database 35 anew as road facility management information. In storing the transmission image information, when update content input in the input reception unit 362 is "corrected," the database update unit 37 corrects the road facility type according to the correction content, changes the road facility status to "normal," and stores the transmission image information in the road facility management information database 35.

If the update content is "broken," "hidden," or "removed," the database update unit 37 may update the road facility status concerning the road facility, leave the original road facility management information without removing the same, and add transmission image information checked by the checker (transmission image information in which abnormality such as breakage, hiding, or removal is detected) to the road facility management information of the road facility. In this case, if the abnormality is eliminated by the road facility administrator, the original road facility management information can be used as information concerning the road facility.

When the road facility management information is updated, the road facility management information database 35 notifies all the on-board devices 10 of database update information including the update content using the transmission unit 31. As explained above, the on-board devices 10 receive the database update information in the transmission units 20 and update the road facility information databases 17 according to the database update information. The road facility information databases 17 are updated in all the on-board devices 10 in this way. Therefore, even if abnormality is present in a road facility, after information concerning the abnormality is reflected on the road facility management information database 35 of the information server 30, transmission image information with the status "abnormality detected" is not transmitted from the on-board device 10. The checker is prevented from redundantly checking a road facility once checked. If the road facility is repaired by the road facility administrator and restored to a normal state, when the on-board device 10 photographs the road facility, a photographed image is different from the information of the road facility information database 17. Therefore, the on-board device 10 regards this as "abnormality detected" and transmits transmission image information to the information server 30. The checker can check whether the road facility is repaired and restored to the normal state using the image in which the abnormality occurs as the reference image and using the image of the road facility repaired and restored to the normal state as the check target image.

The operation of the road facility management system 100 configured as explained above is explained with reference to the drawings. First, the operation of the on-board device 10 is explained and then the operation of the information server 30 is explained.

Figure 11:
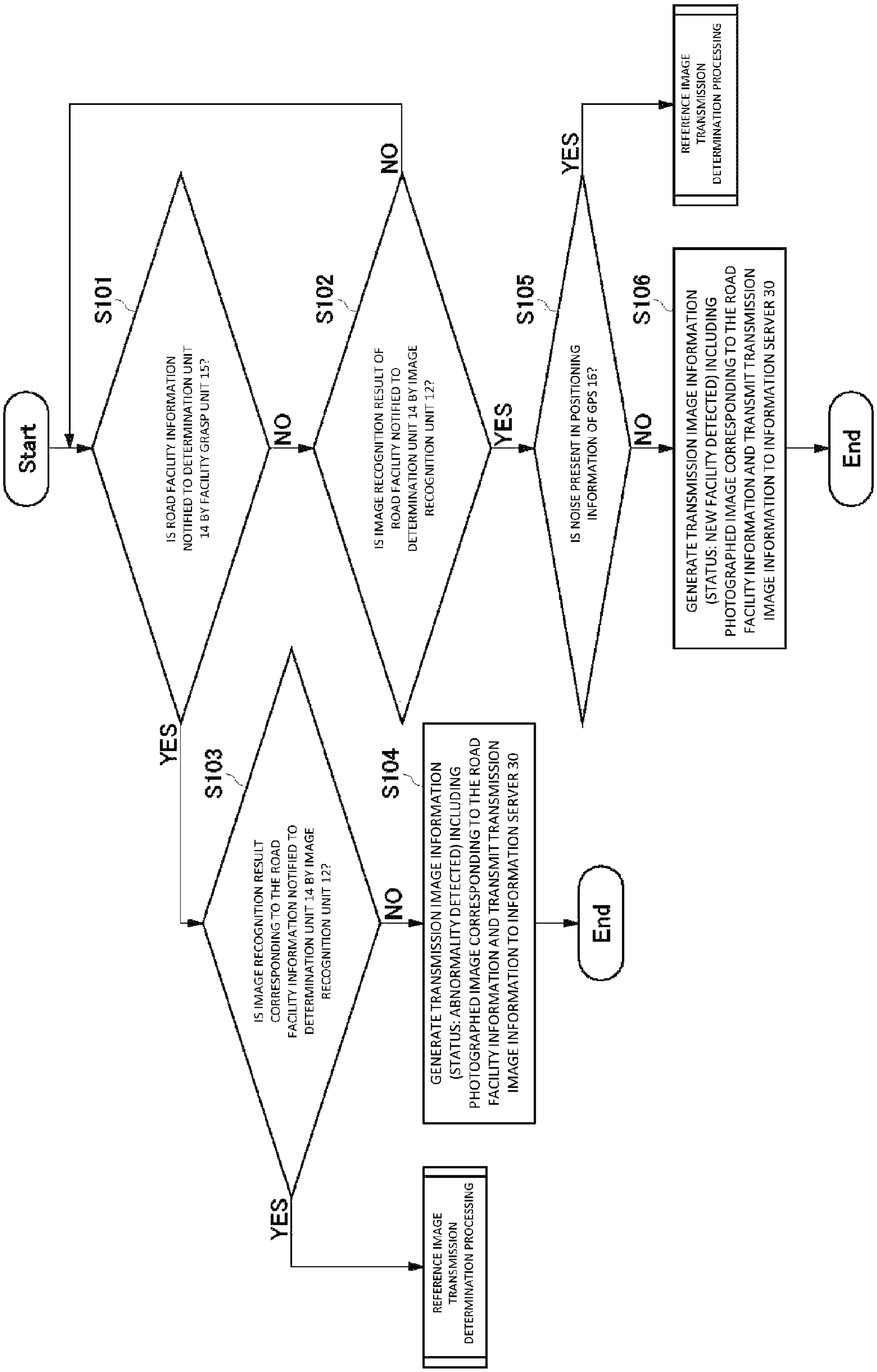
FIG. 11 is an operation flowchart of the on-board device in the embodiment of the present invention.

FIG. 11 is an operation flowchart of the on-board device 10. First, the on-board device 10 watches whether road facility information or an image recognition result is notified to the determination unit 14. Specifically, the on-board device 10 determines whether road facility information is notified to the determination unit 14 by the facility grasp unit 15 (step S101). If road facility information is not notified (NO in step S101), the on-board device 10 determines whether an image recognition result of a road facility is notified to the determination unit 14 by the image recognition unit 12 (step S102). If an image recognition result is not notified (NO in step S102), the on-board device 10 returns to step S101 and continues to watch whether road facility information or an image recognition result is notified.

If road facility information is notified to the determination unit 14 by the facility grasp unit 15 (YES in step S101), the on-board device 10 determines whether an image recognition result corresponding to the road facility information is notified to the determination unit 14 by the image recognition unit 12 (step S103). If an image recognition result corresponding to the road facility information is not notified (NO in step S103), the on-board device 10 generates, in the transmission image information generation unit 13, transmission image information including a photographed image corresponding to the road facility information and transmits the generated transmission image information to the information server 30 from the transmission unit 20 (step S104). At this point, the on-board device 10 sets the status of the transmission image information to "abnormality detected." On the other hand, if an image recognition result corresponding to the road facility information is notified in step S103 (YES in step S103), the on-board device 10 shifts to the reference image transmission determination processing.

If an image recognition result of the road facility is notified in step S102 (YES in step S102), the on-board device 10 determines whether noise is present in positioning information of the GPS 16 (step S105). If noise is absent, the on-board device 10 generates, in the transmission image information generation unit 13, transmission image information including a photographed image related to the image recognition result and transmits the generated transmission image information to the information server 30 from the transmission unit 20 (step S106). At this point, the on-board device 10 sets the status of the transmission image information to "new facility detected." On the other hand, if noise is present in the positioning information of the GPS 16 in step S105 (YES in step S105), the on-board device 10 shifts to the reference image transmission determination processing after performing correction by map matching. If it is determined in step S105 that noise is absent in the positioning information of the GPS 16, the on-board device 10 may perform search again to find whether road facility information related to the image recognition result notified in step S102 is present in the road facility information database 17. As a result of the search, if the road facility information is certainly absent in the road facility information database 17, the on-board device 10 may shift to step S106, generate, in the transmission image information generation unit 13, transmission image information including a photographed image related to the image recognition result, and transmit the generated transmission image information to the information server 30 from the transmission unit 20.

Figure 12:
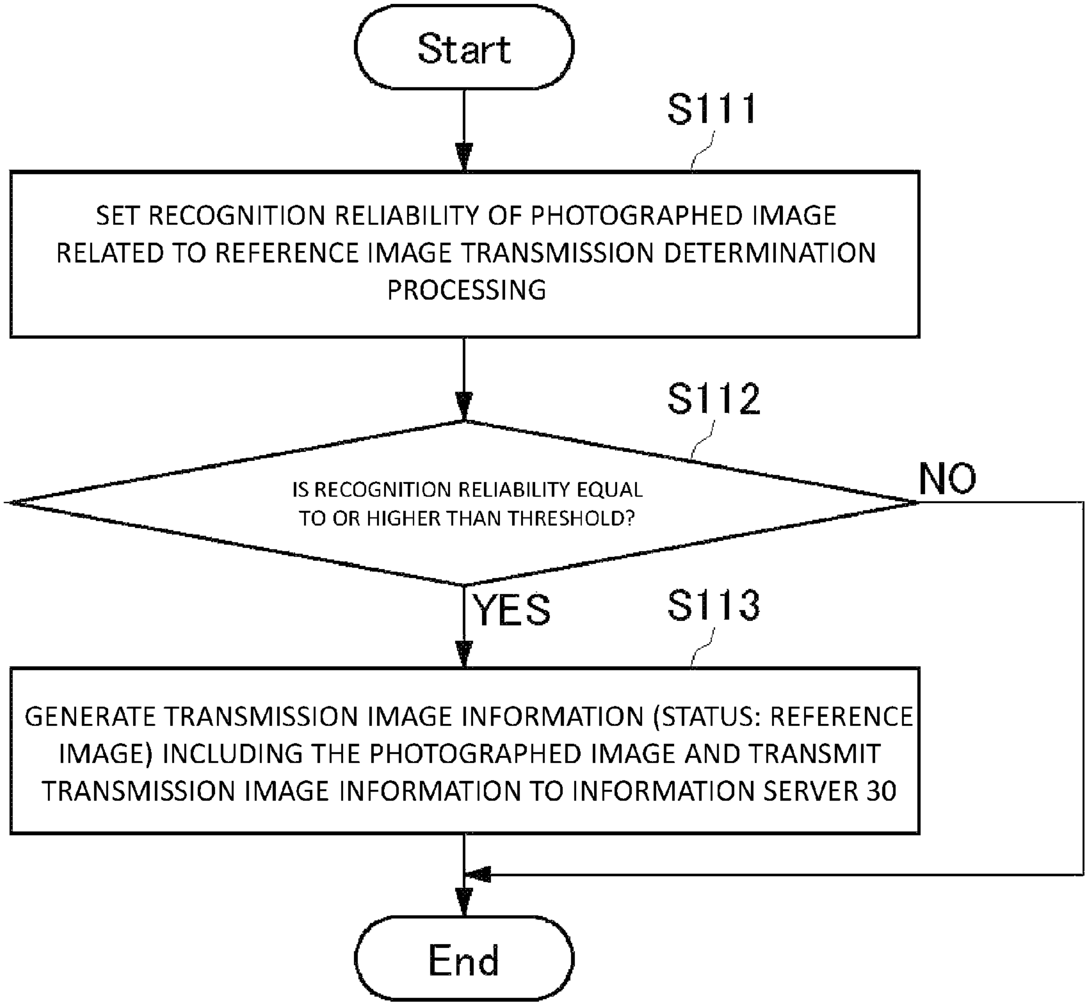
FIG. 12 is an operation flowchart of reference image transmission determination processing of the on-board device in the embodiment of the present invention.

FIG. 12 is an operation flowchart of the reference image transmission determination processing in the on-board device 10. First, the on-board device 10 sets, in the image recognition unit 12, recognition reliability concerning a photographed image related to the reference image transmission determination processing (step S111). As explained already, a score indicating a degree of coincidence of pattern matching in the image recognition by the image recognition unit 12 is set as the recognition reliability. Subsequently, the on-board device 10 determines whether the recognition reliability is equal to or higher than a predetermined threshold (step S112). If the reference image transmission determination processing is performed, the result of the image recognition is notified to the determination unit 14 (the road facility is detected) in step S102 or S103 of the flow shown in FIG. 10. Therefore, the score of the pattern matching exceeds at least a threshold (e.g., 60) for determining that a road facility is detected. In step S112, the on-board device 10 not only detects a road facility in the photographed image but also determines whether the road facility can be more surely recognized. Therefore, a threshold (e.g., 80) higher than the threshold in the image recognition is used.

If the recognition reliability is equal to or higher than the predetermined threshold (YES in step S112), the on-board device 10 generates, in the transmission image information generation unit 13, transmission image information including the photographed image and transmits the generated transmission image information to the information server 30 from the transmission unit 20 (step S113). At this point, the on-board device 10 sets the status of the transmission image information to "reference image." If the recognition reliability is smaller than the predetermined threshold (No in step S112), the on-board device 10 directly ends the processing.

Figure 13:
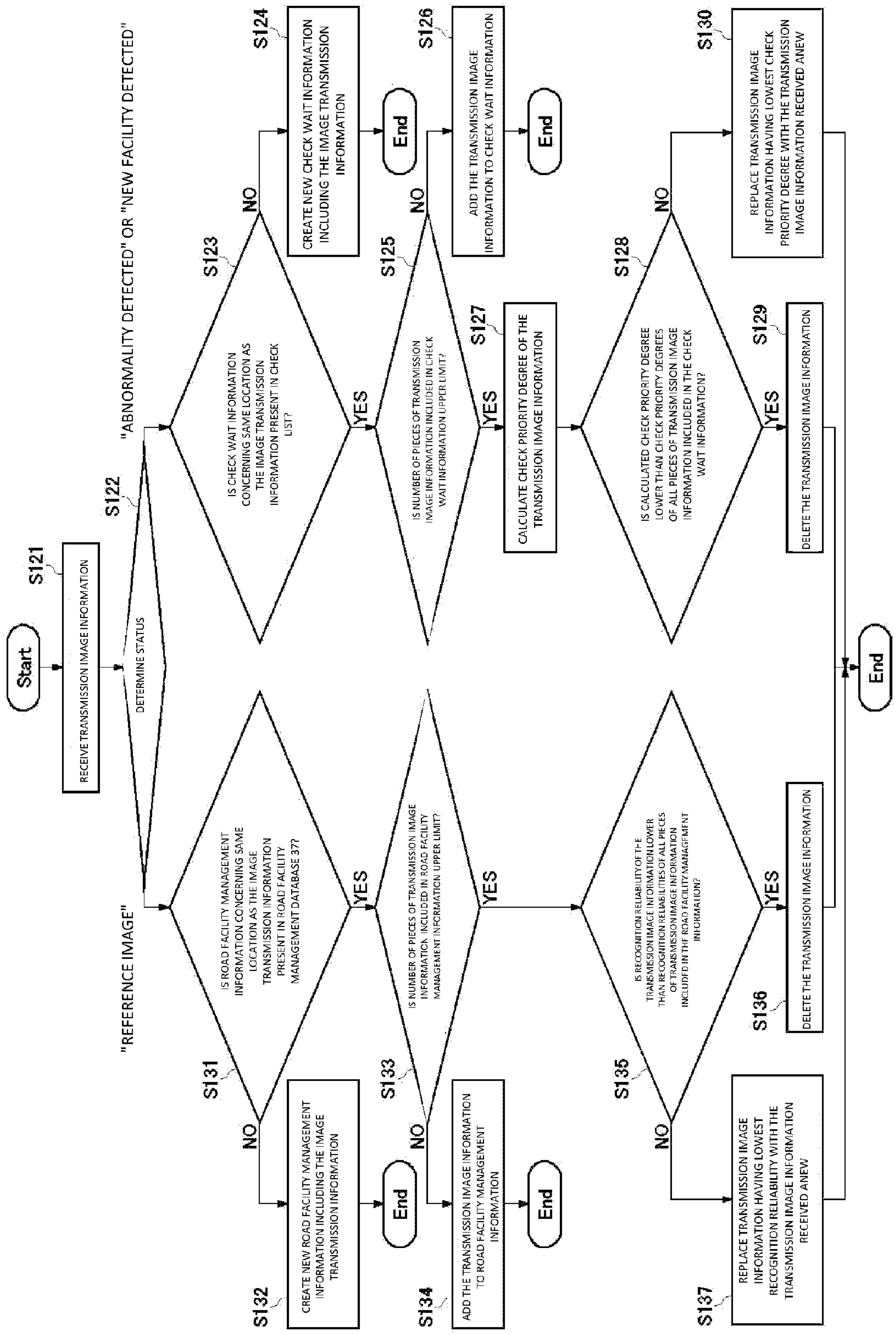
FIG. 13 is an operation flowchart during transmission image information reception of the information server in the embodiment of the present invention.

FIG. 13 is an operation flowchart of an operation performed when the information server 30 receives transmission image information. When the information server 30 receives transmission image information in the transmission unit 31 (step S121), first, the information server 30 performs status determination (step S122). The status determination processing is performed by checking a status in metadata included in the transmission image information received by the information determination unit 32. When the status is "abnormality detected" or "new facility detected," the information server 30 shifts to step S123 and the information determination unit 32 performs the check list update processing. When the status is "reference image," the information server 30 shifts to step S131 and the database update unit 37 performs the reference image update processing.

In the check list update processing, first, the information determination unit 32 determines whether check wait information concerning the same location as the image transmission information is present in the check list of the check list storage unit 33 (step S123). If check wait information concerning the same location is absent in the check list (NO in step S123), the information determination unit 32 creates new check wait information including the image transmission information (step S124). If the information determination unit 32 creates new check wait information, the information determination unit 32 refers to, concerning "location information" (see FIG. 7), information concerning a photographing location in the metadata included in the image transmission information and sets photographing date and time in the metadata included in the image transmission information as "earliest photographing date and time" (see FIG. 7).

If the check wait information concerning the same location is already present in the check list (YES in step S123), the information determination unit 32 determines whether the number of pieces of transmission image information included in the check wait information is a predetermined upper limit (e.g., three) (step S125). If the number of pieces of transmission image information does not reach the upper limit (NO in step S125), the information determination unit 32 adds the transmission image information to the check wait information (step S126). If the number of pieces of transmission image information already reaches the upper limit (YES in step S125), the information determination unit 32 calculates a check priority degree of the transmission image information (step S127) and determines whether the calculated check priority degree is lower than check priority degrees of all the pieces of transmission image information included in the check wait information (step S128). If the calculated check priority degree is lower than the check priority degrees of all the pieces of transmission image information included in the check wait information (YES in step S128), the information determination unit 32 deletes the transmission image information (step S129) and ends the processing. If the calculated check priority degree is higher than a priority check degree of any one of the pieces of transmission image information included in the check wait information (NO in step S128), the information determination unit 32 deletes the transmission image information having the lowest check priority degree among the pieces of transmission image information included in the check wait information and adds the transmission image information received anew to the check wait information instead of the deleted transmission image information (step S130).

As a result of determining a status in step S122, when the status is "reference image," the information server 30 shifts to step S131 and the database update unit 37 performs the reference image update processing. In the reference image update processing, first, the database update unit 37 determines whether road facility management information concerning the same location as the image transmission information received anew is present in the road facility management information database 35 (step S131). If road facility management information concerning the same location is absent (NO in step S131), the database update unit 37 creates new road facility management information including the image transmission information (step S132). If new road facility management information is created, the database update unit 37 gives "road facility ID" (see FIG. 8) not to overlap other road facility management information. The database update unit 37 refers to, concerning "location information" (see FIG. 8), information concerning a photographing position in the metadata included in the image transmission information and sets a road facility type in the metadata included in the image transmission information as "road facility type" (see FIG. 8).

If the road facility management information concerning the same position is already present in the road facility management information database 35 (YES in step S131), the database update unit 37 determines whether the number of pieces of transmission image information included in the road facility management information is a predetermined upper limit (e.g., six) (step S133). If the number of pieces of transmission image information does not reach the upper limit (NO in step S133), the database update unit 37 adds the transmission image information to the road facility management information (step S134). If the number of pieces of transmission image information already reaches the upper limit (YES in step S133), the database update unit 37 determines whether recognition reliability of the transmission image information is lower than recognition reliabilities of all the pieces of transmission image information included in the road facility management information (step S135). If the recognition reliability of the transmission image information is lower than the recognition reliabilities of all the pieces of transmission image information included in the road facility management information (YES in step S135), the database update unit 37 deletes the transmission image information (step S136) and ends the processing. If the recognition reliability of the transmission image information is higher than recognition reliability of any one of the pieces of transmission image information included in the road facility management information (NO in step S135), the database update unit 37 deletes the transmission image information having the lowest recognition reliability among the pieces of transmission image information included in the road facility management information and adds the transmission image information received anew to the road facility management information instead of deleted the transmission image information (step S137). The operation performed when the information server 30 receives the transmission image information is explained above.

Figure 14:
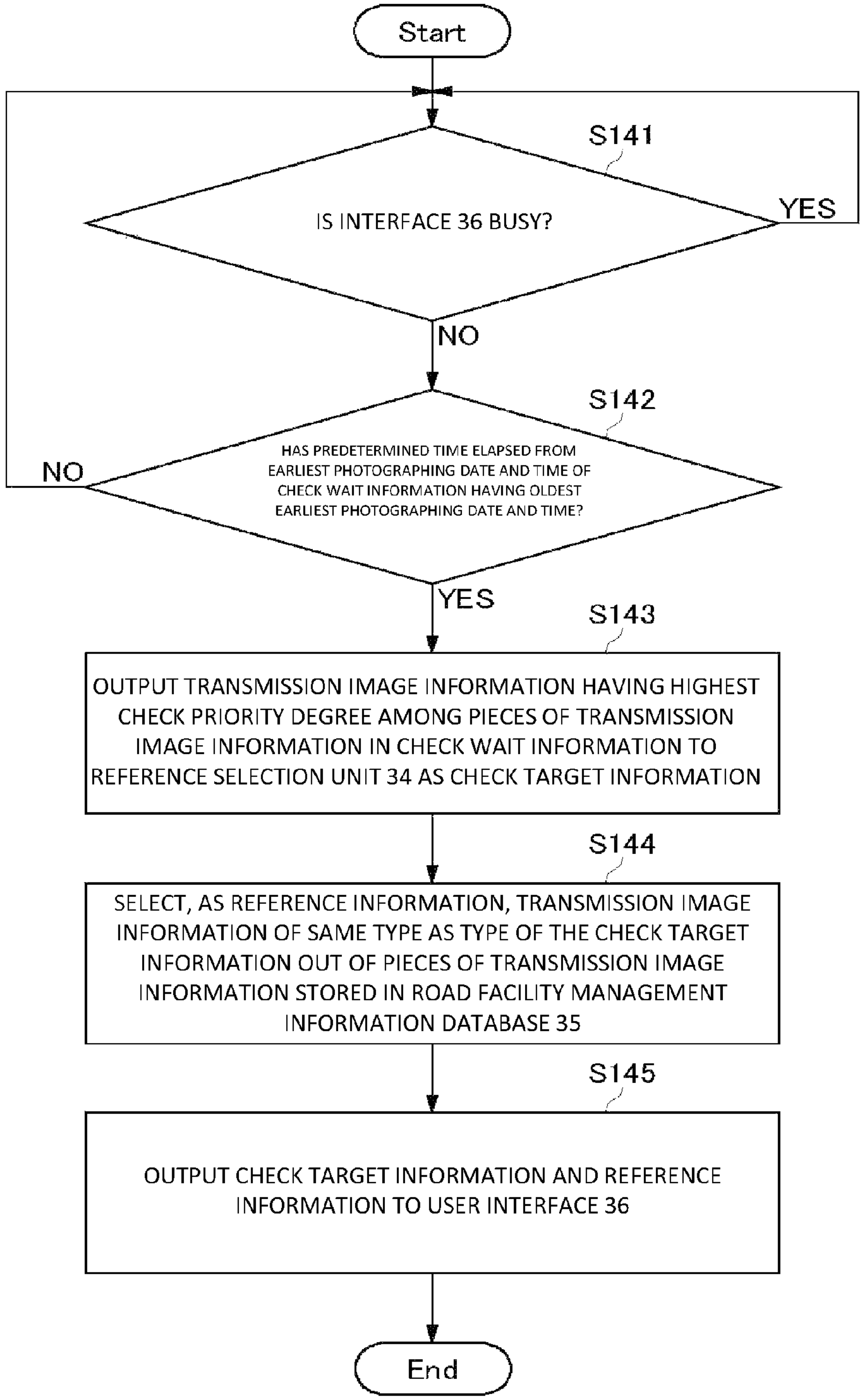
FIG. 14 is an operation flowchart for causing a checker to check a photographed image in the embodiment of the present invention.

Next, an operation for causing the checker to check a photographed image in the information server 30 is explained. FIG. 14 is an operation flowchart of the information server for causing the checker to check a photographed image. First, the information server 30 determines whether the interface 36 is busy (step S141). In this step, while check processing for a photographed image is performed in the interface 36 concerning a certain road facility, the information server 30 determines that the interface 36 is busy. While the check processing for a photographed image is not performed, the information server 30 determines that the interface 36 is not busy. If the interface 36 is busy (YES in step S141), the information server 30 repeats the step S141 and waits for the interface 36 to become not busy.

If the interface 36 is not busy in step S141 (NO in step S141), the information server 30 specifies check wait information having the oldest earliest photographing date and time in the check list of the check list storage unit 33 and determines whether a predetermined time (e.g., 72 hours) already elapses from the earliest photographing date and time (step S142). If time equal to or longer than the predetermined time does not elapse (NO in step S142), the information server 30 returns to step S141. If time equal to or longer than the predetermined time already elapses from the earliest photographing date and time of the check wait information (YES in step S142), the information determination unit 32 outputs transmission image information having the highest check priority degree among pieces of transmission image information in the check wait information to the reference selection unit 34 as check target information (step S143). The reference selection unit 34 selects, as reference information, transmission image information having photographing conditions closer to photographing conditions for the check target information out of the pieces of transmission image information stored in the road facility management information database 35 (step S144). If the relevant transmission image information is absent in the road facility management information database 35, the reference selection unit 34 does not select reference information. Subsequently, the reference selection unit 34 outputs the check target information and the reference information to the user interface 36 (step S145).

The embodiment of the present invention is explained above by means of illustration. However, the scope of the present invention is not limited to the embodiment and can be changed and modified according to purposes within the scope described in claims.

For example, in the embodiment, when the information server 30 receives transmission image information with the status "abnormality detected" or "new facility detected" from the on-board device 10, the information server 30 performs the processing for causing the checker to check a photographed image included in the transmission image information. However, if the reliability of the received transmission image information is extremely high, the information determination unit 32 may omit the check by the checker and directly update the road facility management information database 35 on the basis of the transmission image information. In this case, the information determination unit 32 refers to recognition reliability included in the transmission image information. When a value of the recognition reliability is equal to or larger than an extremely high predetermined threshold (e.g., equal to or larger than 95), the information determination unit 32 directly outputs the transmission image information to the database update unit 37. When the database update unit 37 receives the transmission image information from the information determination unit 32, the database update unit 37 updates the road facility management information database 35 on the basis of the transmission image information.

In the embodiment, the road facility information including the location information is stored in the road facility information database 17 in advance. The facility grasp unit 15 of the on-board device 10 extracts, on the basis of positioning information of the GPS 16, road facility information having location information corresponding to the positioning information. However, road facility information including direction information of road facilities may be stored in the road facility information database 17 in addition to the location information. The facility grasp unit 15 may extract, taking into account a moving direction of the vehicle C obtained from a vehicle-mounted gyro sensor in addition to the positioning information, road facility information corresponding to the moving direction and the positioning information. The direction information of a road facility is information indicating from which direction the road facility is seen. According to the direction information, it is possible to prevent a situation in which the vehicle C running on a down line cannot detect a sign for an up line and "abnormality detected" is determined.

In the embodiment, the road facility information database 17 of the on-board device 10 is used for detecting abnormality or a new facility from an image photographed by the camera 11. However, information for driving support may be given to a driver of the vehicle C using the road facility information database 17. In this case, the on-board device 10 retrieves road facility information corresponding to the present location of a vehicle from the road facility information database 17 and presents the road facility information to the driver by sound or the like. For example, if a sign "stop" is present ahead of the present location of the vehicle in a moving direction and a road facility status of the sign is "hidden," the on-board device 10 outputs sound "a sign is hidden ahead, please stop temporarily" and calls the driver's attention. Further, contents of the road facility information database 17 may be given to a navigation system. In this case, the navigation system can inform the driver what kinds of road facilities are present and where the road facilities are present as well as statuses of the road facilities.

In the embodiment, when road facility information is passed from the on-board device 10 to the information server 30, the on-board device 10 may store the road facility information in a recording medium such as a flash memory and the information server 30 may read out the road facility information from the recording medium.

In the embodiment, the road facility management system for mainly managing road facilities such as signs is explained as an example of the road condition management system according to the present invention. However, the road condition management system according to the present invention may be a system for managing not only road facilities but also other road conditions such as cave-ins of roads due to an earthquake or a heavy rain, holes formed on the roads, and fallen objects on the roads. In such a system, when the checker recognizes the abnormality of a road explained above, a database (a road condition information database) equivalent to the road facility information database 17 only has to be updated. Further, information only has to be provided to, for example, in the case of a sign, a road facility repairer or, in the case of a structure such as a building, a repairer of the structure as well. If the repairer finishes repairing work or the like later, after the checker checks repairing content, the abnormality of the road only has to be deleted from the road condition information database.

The preferred embodiment of the present invention conceivable at the present point is explained above. However, various modifications are possible concerning the embodiment. It is intended that the appended claims include all such modifications within the true spirit and the scope of the present invention.

INDUSTRIAL APPLICABILITY

As explained above, the road facility management system according to the present invention has effects that it is possible to grasp an accurate state of a road condition and reduce a burden on the checker. The road facility management system is useful as a road condition management system or the like for acquiring information concerning a road condition in a vehicle and managing the road condition.

REFERENCE SIGNS LIST

10 on-board device
11 camera
12 image recognition unit
13 transmission image information generation unit
14 determination unit
15 facility grasp unit
16 GPS
17 road facility information database
18 vehicle information acquisition unit
19 database update unit
20 transmission unit
21 server request reception unit
30 information server
31 transmission unit
32 information determination unit
33 check list storage unit
34 reference selection unit
35 road facility management information database
36 user interface
361 display unit
362 input reception unit
37 database update unit
38 necessary image request unit
60 check screen (abnormality detection)
601 check basic information area
602 image area
603 input area
70 check screen (new facility detection)
701 check basic information area
702 image area
703 input area
100 road facility management system

The invention claimed is:

1. A road condition management system for managing a road condition, the road condition management system comprising:

an on-board device; and
an information server, wherein
the on-board device includes:
a camera configured to be attached to a vehicle to photograph an outside of the vehicle;
an image recognition unit that applies image recognition for detecting a road condition to a photographed image obtained by photographing by the camera;
a transmission image information generation unit that generates transmission image information including the photographed image;
a road condition information database having stored therein road condition information; and
a transmission image information output unit that outputs the transmission image information when a recognition result by the image recognition unit is different from the road condition information stored in the road condition information database, and
the information server includes:
a reception unit that receives the transmission image information;
a photographed image output unit that outputs the photographed image included in the transmission image information to enable a checker to visually recognize the photographed image;
an input unit for the checker to input a check result of the photographed image output from the photographed image output unit;
a road condition management information database having stored therein reference images as road condition management information for managing a road condition; and
a reference selection unit that selects a reference image corresponding to a photographed image from the road condition management information database, wherein the photographed image output unit outputs, together with the photographed image, the reference image selected by the reference selection unit.

2. The road condition management system according to claim 1, wherein the information server updates the road condition management information database according to the check result.

3. The road condition management system according to claim 1, wherein the on-board device updates the road condition information database according to the check result.

4. The road condition management system according to claim 1, wherein the on-board device outputs the transmission image information in the transmission image information output unit when a road condition corresponding to the road condition information stored in the road condition information database is not detected in the image recognition unit.

5. The road condition management system according to claim 1, wherein the on-board device generates transmission image information in the transmission image information generation unit when a road condition not stored in the road condition information database is detected in the image recognition unit.

6. The road condition management system according to claim 1, wherein the road condition management information includes plural reference images concerning one road condition, and the reference selection unit selects a reference image having photographing conditions closest to photographing conditions for the photographed image output by the photographed image output unit.

7. The road condition management system according to claim 1, wherein even when a detection result by the image recognition unit coincides with the road condition information stored in the road condition information database, the transmission image information output unit outputs, when reliability of the image recognition by the image recognition unit is high, transmission image information in which a photographed image is designated as a reference image candidate, and the information server stores the reference image candidate in the road condition management information database as a reference image of the road condition management information, and the reliability of the image recognition is a degree of coincidence of a pattern of a road condition stored in advance and a pattern included in a photographed image.

8. The road condition management system according to claim 1, wherein the information server includes a necessary image request unit that requests, when a reference image corresponding to a photographed image included in transmission image information is not stored in the road condition management information server, the on-board device to send a reference image candidate corresponding to the photographed image, and the transmission image information output unit outputs, in response to the request, transmission image information including a photographed image corresponding to the photographed image.

9. The road condition management system according to claim 1, wherein, when the reception unit receives plural pieces of transmission image information concerning one road condition, the photographed image output unit preferentially outputs a photographed image included in transmission image information having a high check priority degree among the plural pieces of transmission image information.

10. The road condition management system according to claim 9, wherein the check priority degree is calculated on the basis of at least one of a photographing period of time of a photographed image included in transmission image information, a vehicle type, and vehicle speed during photographing.

11. The road condition management system according to claim 9, wherein the information server includes a check list storage unit for storing transmission image information received by the reception unit, and the photographed image output unit outputs the transmission image information stored in the check list storage unit.

12. The road condition management system according to claim 1, wherein the transmission image information output unit of the on-board device transmits transmission image information to the information server by radio communication, and the reception unit of the information server receives the transmission image information from the on-board device by radio communication.

13. The road condition management system according to claim 1, wherein the transmission image information output unit of the on-board device records transmission image information in a recording medium, and the reception unit of the information server reads out the transmission image information from the recording medium.

14. An on-board device belonging to a road condition management system for managing a road condition with an information server, the information server outputting, together with a reference image as road condition management information for managing a road condition, a photographed image included in transmission image information outputted from the on-board device to enable a checker to visually recognize the photographed image, the on-board device comprising:

a camera configured to be attached to a vehicle to photograph an outside of the vehicle;

an image recognition unit that applies image recognition for detecting a road condition to a photographed image obtained by photographing by the camera;

a transmission image information generation unit that generates transmission image information including the photographed image;

a road condition information database having stored therein road condition information; and a transmission image information output unit that outputs the transmission image information when a recognition result by the image recognition unit is different from the road condition information stored in the road condition information database.

15. An information server for managing a road condition, the information server comprising:

a reception unit that receives transmission image information including a photographed image obtained by photographing by a camera configured to be attached to a vehicle to photograph an outside of a vehicle;

a photographed image output unit that outputs the photographed image included in the transmission image information to enable a checker to visually recognize the photographed image;

an input unit for the checker to input a check result of the photographed image output from the output unit;

a road condition management information database having stored therein reference images as road condition management information for managing a road condition; and a reference selection unit that selects a reference image corresponding to a photographed image from the road condition management information database, wherein the photographed image output unit outputs, together with the photographed image, the reference image selected by the reference selection unit.

16. A road condition management method executed using a road condition management system including an on-board device and an information server, the road condition management method comprising:

in the on-board device, photographing an outside of a vehicle with a camera;

applying image recognition for detecting a road condition to a photographed image obtained by photographing by the camera; and outputting transmission image information including the photographed image when a result of the image recognition is different from road condition information stored in a database of the on-board device, and in the information server, receiving the transmission image information;

outputting the photographed image included in the transmission image information to enable a checker to visually recognize the photographed image;

selecting a reference image corresponding to the photographed image from a road condition management information database having stored therein reference images as road condition management information for managing a road condition;

outputting the selected reference image together with the photographed image; and the checker checking the output photographed image and inputting a check result.

* * * * *